US012793690B2

(12) United States Patent
Ueno

(10) Patent No.: US 12,793,690 B2
(45) Date of Patent: Nov. 10, 2026

(54) ACTIVE NOISE REDUCTION DEVICE AND MOBILE OBJECT

(71) Applicant: Panasonic Automotive Systems Co., Ltd., Kanagawa (JP)

(72) Inventor: Shotaro Ueno, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 125 days.

(21) Appl. No.: 18/884,755

(22) Filed: Sep. 13, 2024

(65) Prior Publication Data

US 2025/0006171 A1 Jan. 2, 2025

Related U.S. Application Data

(63) Continuation of application No. PCT/JP2023/003283, filed on Feb. 1, 2023.

(30) Foreign Application Priority Data

Mar. 29, 2022 (JP) ................................ 2022-053368

(51) Int. Cl.
*G10K 11/178* (2006.01)

(52) U.S. Cl.
CPC .. *G10K 11/17854* (2018.01); *G10K 11/17879* (2018.01)

(58) Field of Classification Search
None
See application file for complete search history.

(56) References Cited

U.S. PATENT DOCUMENTS 8,600,069 B2 * 12/2013 Lee .................. G10K 11/17823 381/86
2004/0247137 A1 12/2004 Inoue et al.
2007/0038441 A1 * 2/2007 Inoue ............... G10K 11/17883 704/226
2008/0310650 A1 12/2008 Nakamura et al.
2013/0315409 A1 * 11/2013 Inoue ..................... G10K 11/16 381/71.1
2017/0294180 A1 10/2017 Hiraga et al.
2021/0225353 A1 * 7/2021 Wang ............... G10K 11/17883

FOREIGN PATENT DOCUMENTS

JP 2004-361721 12/2004
JP 2007-025527 2/2007
JP 2009-255784 11/2009
WO 2017/006547 1/2017
WO WO-2023152678 A1 * 8/2023 ....... G10K 11/17819

OTHER PUBLICATIONS

International Search Report issued in International Pat. Appl. No. PCT/JP2023/003283, dated Apr. 25, 2023, along with an English translation thereof.

* cited by examiner

*Primary Examiner* — Qin Zhu
(74) *Attorney, Agent, or Firm* — Greenblum & Bernstein, P.L.C.

(57) ABSTRACT

An active noise reduction device includes: a plurality of first adaptive filters; a plurality of feedback filters; an adder that adds a cancellation signal outputted by each of the plurality of first adaptive filters, and outputs a cancellation signal resulting from the addition; and a band elimination filter that is disposed in at least one of a first path from each of the plurality of first adaptive filters to a loudspeaker or a second path from a microphone to each of the plurality of first adaptive filters.

11 Claims, 19 Drawing Sheets

ACTIVE NOISE REDUCTION DEVICE AND MOBILE OBJECT

CROSS REFERENCE TO RELATED APPLICATION

This is a continuation application of PCT International Application No. PCT/JP2023/003283 filed on Feb. 1, 2023, designating the United States of America, which is based on and claims priority of Japanese Patent Application No. 2022-053368 filed on Mar. 29, 2022.

FIELD

The present disclosure relates to, for example, an active noise reduction device that actively reduces noise.

BACKGROUND

Patent Literature (PTL) 1 discloses an active vibration noise control device that is sufficiently effective for vibration noise control.

CITATION LIST

Patent Literature

PTL 1: Japanese Unexamined Patent Application Publication No. 2004-361721

SUMMARY

The present disclosure provides an active noise reduction device that is capable of improving upon the above related art.

An active noise reduction device according to one aspect of the present disclosure is an active noise reduction device that reduces noise in a space in which a loudspeaker and a microphone are disposed, by outputting cancellation sound from the loudspeaker, the active noise reduction device comprising: a plurality of first adaptive filters each of which outputs a cancellation signal used to output the cancellation sound by applying a filter coefficient to a reference signal having a specific frequency, the filter coefficient being successively updated based on an error signal outputted from the microphone; a plurality of feedback filters each of which multiplies the cancellation signal outputted by one of the plurality of first adaptive filters corresponding to the feedback filter by a gain coefficient, and outputs the cancellation signal multiplied by the gain coefficient to the first adaptive filter; an adder that adds the cancellation signal outputted by each of the plurality of first adaptive filters, and outputs a cancellation signal resulting from the addition; and a band elimination filter that is disposed in at least one of a first path from each of the plurality of first adaptive filters to the loudspeaker or a second path from the microphone to each of the plurality of first adaptive filters.

The active noise reduction device according to one aspect of the present disclosure is capable of improving upon the above related art.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENT

Hereinafter, an embodiment is specifically described with reference to the drawings. It should be noted that the embodiment described below shows a general or specific example. The numerical values, shapes, materials, constituent elements, the arrangement and connection of the constituent elements, steps, and the order of steps, etc. shown in the following embodiment are mere examples and are not intended to limit the present disclosure. In addition, among the constituent elements in the following embodiment, constituent elements not recited in any one of the independent claims are described as arbitrary constituent elements.

Moreover, the respective figures are schematic diagrams and are not necessarily precise illustrations. It should be noted that substantially the same constituent elements are given the same reference signs in the respective figures, and overlapping descriptions thereof may be omitted or simplified.

Embodiment (Underlying Knowledge Forming Basis of the Present Disclosure)

In order to reduce narrowband noise generated in the interior space of a vehicle such as an automobile, active noise reduction devices including an adaptive filter capable of reducing single-frequency noise have been in practical use. However, there is a problem with such active noise reduction devices that it is difficult to sufficiently reduce noise when the frequency of noise is shifted by 1 Hz from an assumed frequency.

Moreover, for broadband noise including random noise such as road noise, active noise reduction devices including an adaptive digital filter having a plurality of taps have been in practical use. In order to achieve such active noise reduction devices, a sensor for obtaining a signal having a high correlation with noise, a digital signal processor that performs high-speed arithmetic processing, etc. are necessary, and there is a huge problem in terms of cost.

In response to these problems, the following embodiment describes an active noise reduction device that is capable of reducing broadband noise using an SAN filtered-x LMS algorithm as a base. It should be noted that SAN stands for a single-frequency adaptive notch filter, and LMS stands for a least mean square.

[Noise Signal Reduction Method Using SAN Algorithm]

Before the active noise reduction device according to the embodiment is described, a noise signal reduction method using an SAN algorithm and a noise reduction method using the SAN filtered-x LMS algorithm are described.

Figure 1:
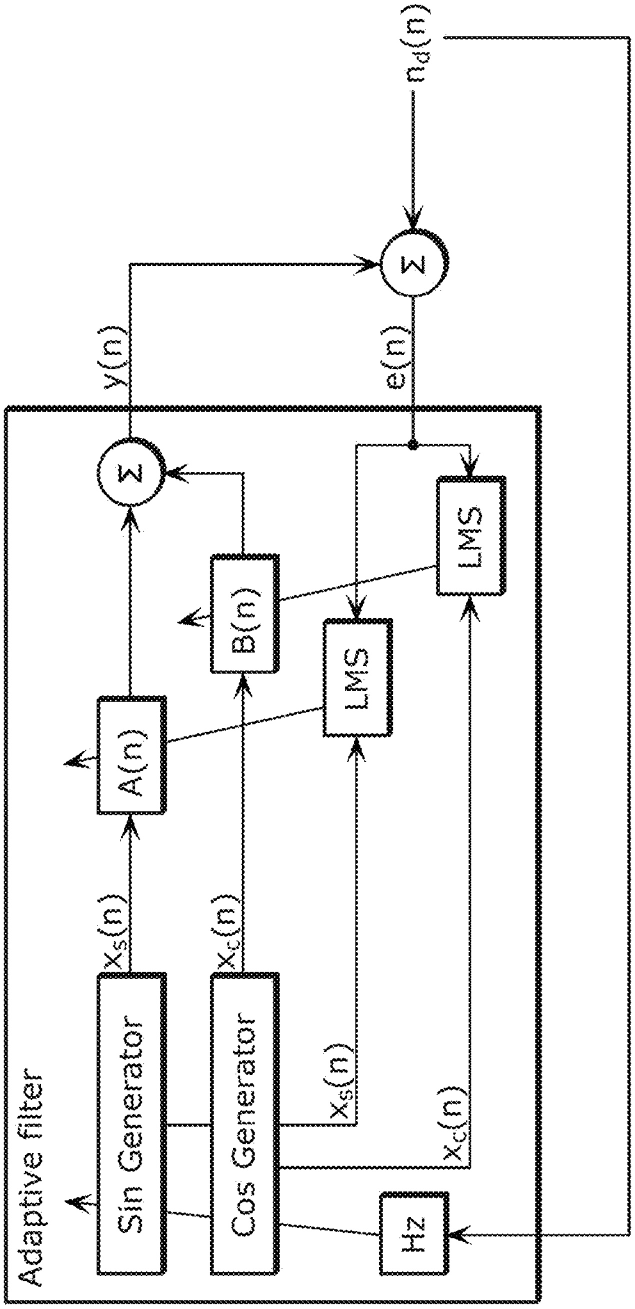
FIG. 1 is a block diagram showing a functional configuration of an adaptive filter that conforms to an SAN algorithm.
Figure 2:
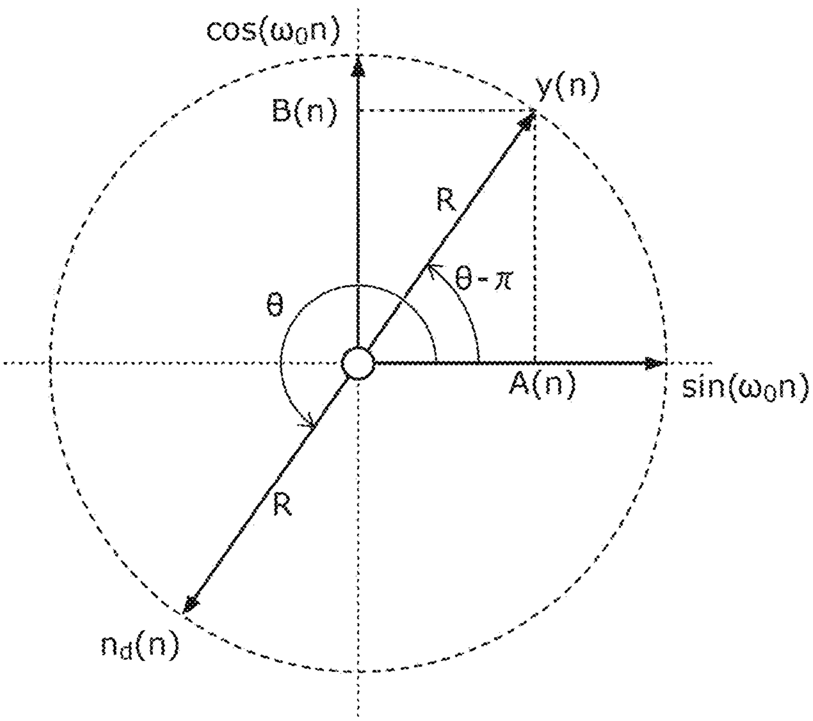
FIG. 2 is a diagram showing a relation between a noise signal and a cancellation signal in the SAN algorithm.

First, the noise signal reduction method using the SAN algorithm is described. FIG. 1 is a block diagram showing a functional configuration of an adaptive filter that conforms to the SAN algorithm. FIG. 2 is a diagram showing a relation between a noise signal (a sinusoidal signal of noise) and a cancellation signal in the SAN algorithm. It should be noted that in the following description of the noise signal reduction method using the SAN algorithm, a noise signal is assumed as a single-frequency sinusoidal signal.

In FIG. 1 and FIG. 2, n is an integer greater than or equal to 0 and indicates a sampling number in a discrete time system. When the frequency of a noise signal to be reduced is denoted by $f_0$ [Hz], normalized angular frequency $\omega_0$[rad] is expressed by [Math. 1] below.

$$\omega 0 = 2\pi f_0 T_s = 2\pi f_0 / f_s \qquad \text{[Math. 1]}$$

In [Math. 1], $T_s$[sec] denotes a sampling period, and $f_s$ [Hz] denotes a sampling frequency. $nT_s$ that denotes discrete time is expressed by n using normalized angular frequency $\omega_0$.

Sinusoidal signal $n_d(n)$ of noise is expressed by [Math. 2] below using normalized angular frequency $\omega_0$, amplitude R, and phase $\theta$[rad].

$$n_d(n) = R\sin(\omega_0 n + \theta) \qquad \text{[Math. 2]}$$

A cancellation signal is generated to reduce $n_d(n)$. Since cancellation signal y(n) and $n_d(n)$ are identical in amplitude and opposite in phase, cancellation signal y(n) is expressed by [Math. 3] below.

$$y(n) = R\sin\{\omega_0 n + (\theta - \pi)\} = A(n)\sin(\omega_0 n) + B(n)\cos(\omega_0 n) \qquad \text{[Math. 3]}$$

A(n) and B(n) denote filter coefficients of the adaptive filter. Amplitude R of cancellation signal y(n) is expressed by the square root of $A(n)^2+B(n)^2$, and phase ($\theta-\pi$) is expressed by the arctangent of B(n)/A(n). Accordingly, the amplitude of the cancellation signal changes when the magnitude of filter coefficients A(n) and B(n) of the adaptive filter is changed, and the phase of the cancellation signal changes when a ratio between filter coefficients A(n) and B(n) of the adaptive filter is changed.

Here, filter coefficients A(n) and B(n) of the adaptive filter are optimized by the LMS algorithm to minimize e(n). e(n) denotes an error signal generated by interference between the noise signal and the cancellation signal. In this manner, the noise signal is reduced.

[Noise Reduction Method Using SAN Filtered-x LMS Algorithm]

Figure 3:
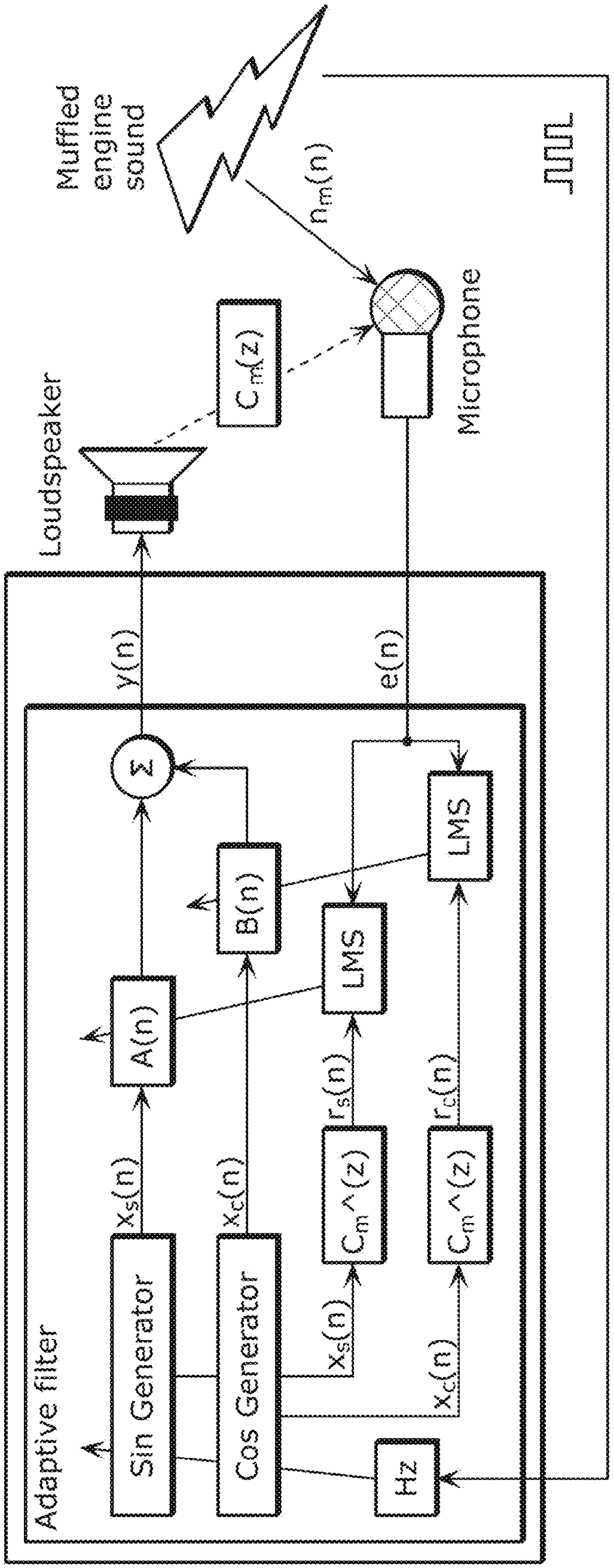
FIG. 3 is a block diagram showing a functional configuration of an adaptive filter that conforms to an SAN filtered-x LMS algorithm.
Figure 4:
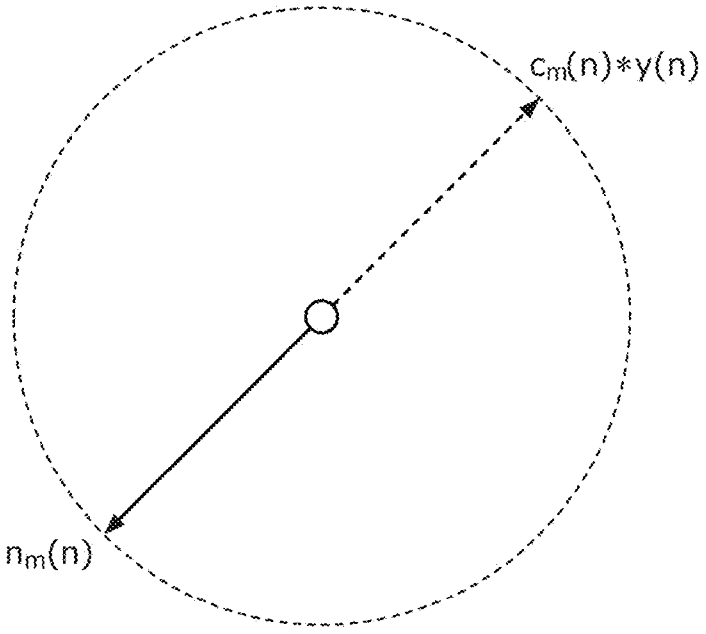
FIG. 4 is a diagram showing a relation between noise and cancellation sound in the SAN filtered-x LMS algorithm.

Next, the noise reduction method using the SAN filtered-x LMS algorithm is described. FIG. 3 is a block diagram showing a functional configuration of an adaptive filter that conforms to the SAN filtered-x LMS algorithm. FIG. 4 is a diagram showing a relation between noise and cancellation sound in the SAN filtered-x LMS algorithm. It should be noted that in the following description of the noise reduction method using the SAN filtered-x LMS algorithm, noise is assumed as muffled engine sound. The muffled engine sound is noise that is instantaneously similar to a single-frequency sinusoidal wave.

A cancellation signal propagates through a loudspeaker, a vehicle interior space, and a microphone and is inputted to the adaptive filter. This transducing pathway is expressed by acoustic transfer function $C_m(z)$. z denotes z-transform. The SAN filtered-x LMS algorithm is an algorithm that is obtained based on the above SAN algorithm and by further taking acoustic transfer function $C_m(z)$ into consideration.

In FIG. 3 and FIG. 4, simulated transfer function $C_m\hat{}(z)$ is a transfer function (filter) that simulates acoustic transfer function $C_m(z)$. $n_m(n)$ denotes muffled engine sound at the position of the microphone having frequency $f_0$ [Hz]. $C_m(n)$ denotes an impulse response in discrete time n of $C_m(z)$. $C_m(n)*y(n)$ denotes cancellation sound at the position of the microphone, and * denotes a convolution operator. It should be noted that although, when muffled engine sound is actually reduced, a convolution operation is integration in continuous time, it is assumed in the following description that the convolution operation is a product-sum operation in discrete time.

In the noise reduction method based on the SAN filtered-x LMS algorithm, filter coefficients A(n) and B(n) converge to optimal values by the following processes (1) to (5) being repeatedly performed.

(1) Frequency $f_0$ [Hz] of muffled engine sound $n_m(n)$ is detected based on a signal indicating the rotational frequency of an engine.

(2) Sinusoidal wave $x_s(n)$ and cosine wave $x_c(n)$ each having frequency $f_0$ [Hz] are generated, multiplied by filter coefficients A(n) and B(n), respectively, and added together to generate cancellation signal y(n) expressed by [Math. 4].

$$y(n) = A(n)x_s(n) + B(n)x_c(n) \quad \text{[Math. 4]}$$

(3) Cancellation sound is outputted from the loudspeaker, based on cancellation signal y(n). At the position of the microphone, residual sound (error signal) e(n) generated by interference between cancellation sound $C_m(n)*y(n)$ and muffled engine sound $n_m(n)$ is detected by the microphone.

(4) Sinusoidal wave $x_s(n)$ and cosine wave $x_c(n)$ are filtered by $C_m\hat{}(z)$ to generate sinusoidal wave $r_s(n)$ and cosine wave $r_c(n)$, respectively.

(5) Filter coefficients A(n) and B(n) are updated based on LMS updating equations shown by [Math. 5] and [Math. 6]. It should be noted that μ denotes a step-size parameter for determining the amount of updating of filter coefficients A(n) and B(n) per sampling.

$$A(n+1) = A(n) - \mu r_s(n)e(n) \quad \text{[Math. 5]}$$

$$B(n+1) = B(n) - \mu r_c(n)e(n) \quad \text{[Math. 6]}$$

[Configuration of Active Nosie Reduction Device]

Figure 5:
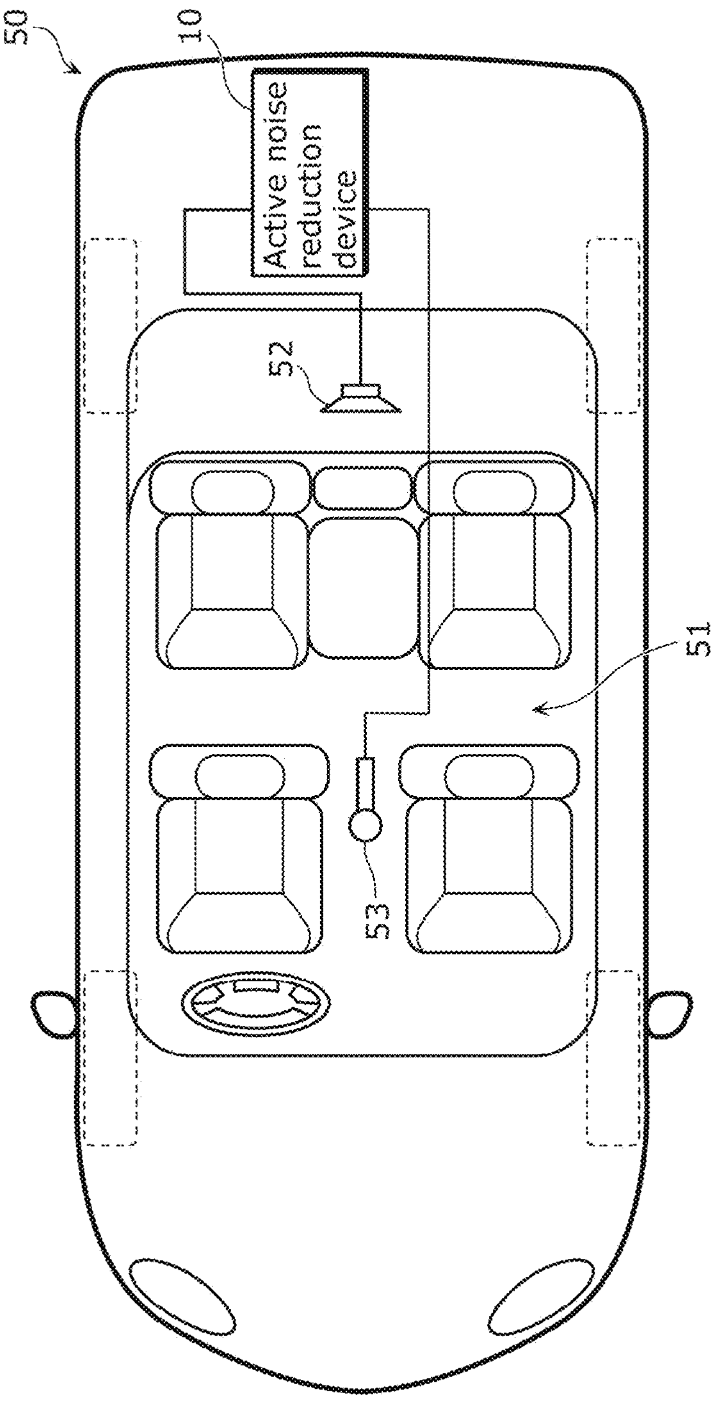
FIG. 5 is a schematic view of a vehicle that includes an active noise reduction device according to an embodiment.
Figure 6:
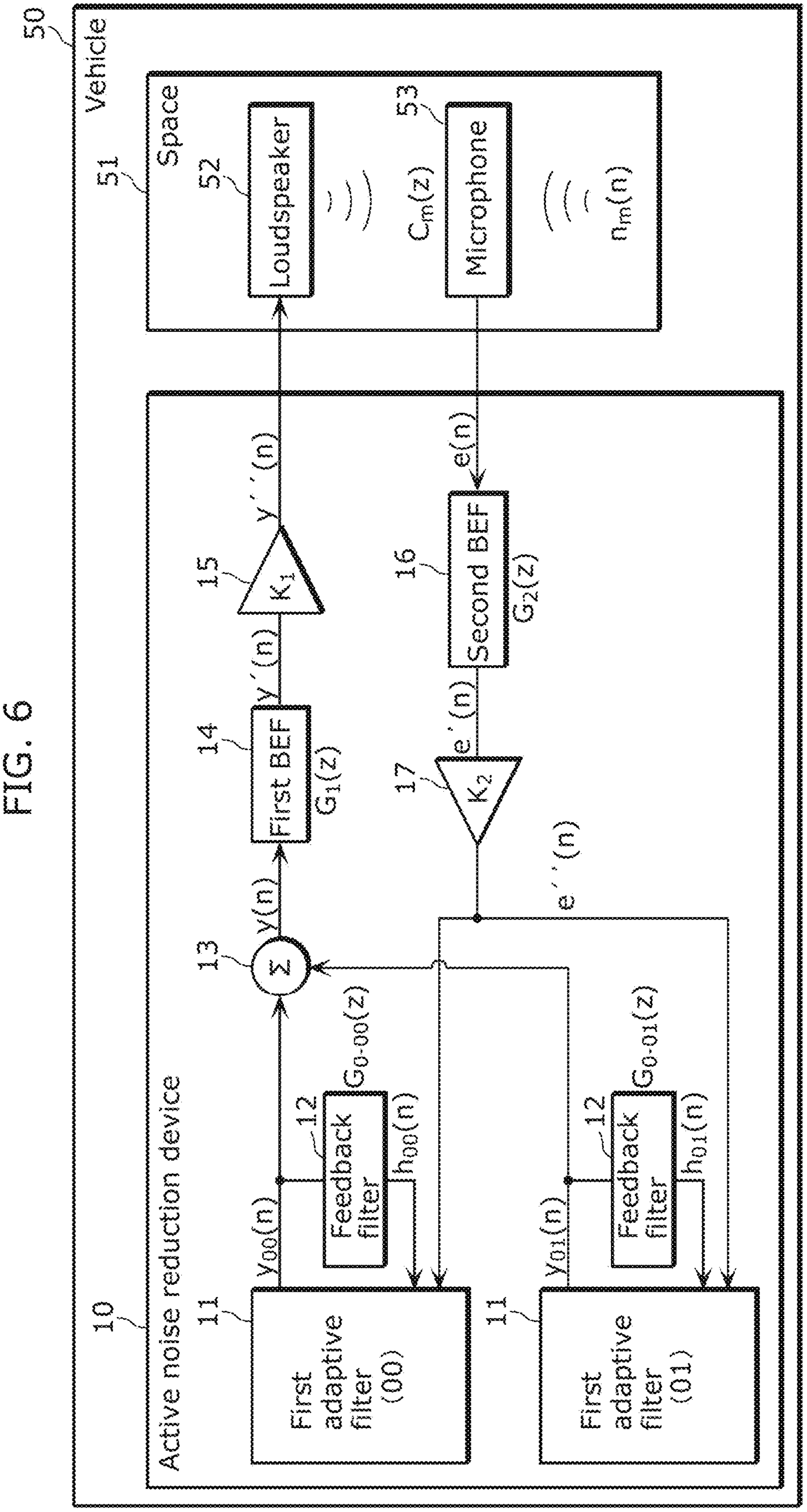
FIG. 6 is a block diagram showing a functional configuration of the active noise reduction device according to the embodiment.

Next, the configuration of the active noise reduction device according to the embodiment is described. FIG. 5 is a schematic view of a vehicle that includes the active noise reduction device according to the embodiment. FIG. 6 is a block diagram showing a functional configuration of the active noise reduction device according to the embodiment.

As shown in FIG. 5, active noise reduction device 10 is mounted on vehicle 50 and reduces noise in space 51 of the vehicle interior. Loudspeaker 52 and microphone 53 are disposed in space 51. It should be noted that although only a set of loudspeaker 52 and microphone 53 is shown in FIG. 5 and FIG. 6 for the sake of simple description, in reality, plural sets of loudspeaker 52 and microphone 53 are disposed in space 51 and used to reduce noise.

Active noise reduction device 10 is an active noise reduction device that reduces noise at a position in which microphone 53 is disposed, using cancellation sound outputted from loudspeaker 52. Active noise reduction device 10 is achieved by, for example, a microprocessor such as a microcontroller or a digital signal processor (DSP) and a storage unit (memory).

As shown in FIG. 6, active noise reduction device 10 specifically includes a plurality of first adaptive filters 11, a plurality of feedback filters 12, adder 13, first band elimination filter 14, first gain adjuster 15, second band elimination filter 16, and second gain adjuster 17. Although active noise reduction device 10 includes two sets of first adaptive filter 11 and feedback filter 12 in the example shown in FIG. 6, active noise reduction device 10 may include three or more sets of first adaptive filter 11 and feedback filter 12.

Although these constituent elements included in active noise reduction device 10 are achieved by the microcontroller executing a computer program (software) stored in the storage unit, part of the constituent elements may be achieved by hardware (a circuit). Hereinafter, each of the constituent elements is described.

The plurality of first adaptive filters 11 each output a cancellation signal by applying, to a reference signal having a specific frequency, a filter coefficient successively updated based on an error signal outputted from microphone 53. The cancellation signal is a signal used to output cancellation sound. First adaptive filter 11 on the upper side of FIG. 6 outputs cancellation signal $y_{00}(n)$, and first adaptive filter 11 on the lower side of FIG. 6 outputs cancellation signal $y_{01}(n)$. It should be noted that although the frequency of a reference signal to be processed by first adaptive filter 11 on the upper side is different from the frequency of a reference signal to be processed by first adaptive filter 11 on the lower side, the frequencies may be the same. The specific configuration of first adaptive filter 11 is described later.

The plurality of feedback filters 12 correspond to the plurality of first adaptive filters 11 on a one-to-one basis. The plurality of feedback filters 12 each multiply a cancellation signal outputted by first adaptive filter 11 corresponding to feedback filter 12 by a gain coefficient, and output (feedback) the cancellation signal multiplied by the gain coefficient to first adaptive filter 11.

Feedback filter 12 on the upper side of FIG. 6 outputs cancellation signal $h_{00}(n)$ generated by multiplying cancellation signal $y_{00}(n)$ outputted by first adaptive filter 11 on the upper side by a gain coefficient, to first adaptive filter 11 on the upper side. Feedback filter 12 on the lower side of FIG. 6 outputs cancellation signal $h_{01}(n)$ generated by multiplying cancellation signal $y_{01}(n)$ outputted by first adaptive filter 11 on the lower side by a gain coefficient, to first adaptive filter 11 on the lower side.

It should be noted that the gain coefficient used for multiplication by feedback filter 12 on the upper side and the gain coefficient used for multiplication by feedback filter 12 on the lower side may be the same or different in value.

Adder 13 adds a cancellation signal outputted by each of the plurality of first adaptive filters 11, and outputs a cancellation signal resulting from the addition. In the example shown in FIG. 6, adder 13 adds cancellation signal $y_{00}(n)$ and cancellation signal $y_{01}(n)$, and outputs cancellation signal y(n) resulting from the addition.

First band elimination filter 14 is disposed in a first path from each of the plurality of first adaptive filters 11 to loudspeaker 52. In the example shown in FIG. 6, first band elimination filter 14 is disposed in a path from adder 13 to loudspeaker 52 included in the first path, and one first band elimination filter 14 is shared by the plurality of first adaptive filters 11. In FIG. 6, first band elimination filter 14 is also denoted by $G_1(z)$.

First band elimination filter 14 is achieved by a second adaptive filter. The second adaptive filter is an adaptive filter that applies, to a reference signal having a specific frequency, a filter coefficient successively updated based on an input signal (cancellation signal y(n)) to first band elimination filter 14, to generate an output signal (cancellation signal y' (n)) from first band elimination filter 14. The specific configuration of first band elimination filter 14 is described later.

First gain adjuster 15 performs gain adjustment on cancellation signal y' (n) outputted from first band elimination filter 14, and outputs cancellation signal y' (n). First gain adjuster 15 is disposed in the first path from each of the plurality of first adaptive filters 11 to loudspeaker 52. In the example shown in FIG. 6, first gain adjuster 15 is disposed in the path from adder 13 to loudspeaker 52 included in the first path, and one first gain adjuster 15 is shared by the plurality of first adaptive filters 11. In FIG. 6, first gain adjuster 15 is also denoted by $K_1$.

Second band elimination filter 16 is disposed in a second path from microphone 53 to each of the plurality of first adaptive filters 11. In the example shown in FIG. 6, second band elimination filter 16 is disposed in a path until the path branches in a manner corresponding to the plurality of first adaptive filters 11, the path being included in the second path, and one second band elimination filter 16 is shared by the plurality of first adaptive filters 11. In FIG. 6, second band elimination filter 16 is also denoted by $G_2$ (z).

As with first band elimination filter 14, second band elimination filter 16 is achieved by the second adaptive filter. The second adaptive filter in this case is an adaptive filter that applies, to a reference signal having a specific frequency, a filter coefficient successively updated based on an input signal (error signal e(n)) to second band elimination filter 16, to generate an output signal (error signal e'(n)) from second band elimination filter 16.

Second gain adjuster 17 performs gain adjustment on error signal e'(n) outputted from second band elimination filter 16, and outputs error signal e"(n). Second gain adjuster 17 is disposed in the second path from microphone 53 to each of the plurality of first adaptive filters 11. In the example shown in FIG. 6, second gain adjust 17 is disposed in a path until the path branches in a manner corresponding to the plurality of first adaptive filters 11, the path being included in the second path, and one second gain adjuster 17 is shared by the plurality of first adaptive filters 11. In FIG. 6, second gain adjuster 17 is also denoted by $K_2$.

[Specific Configuration of First Adaptive Filter]

Figure 7:
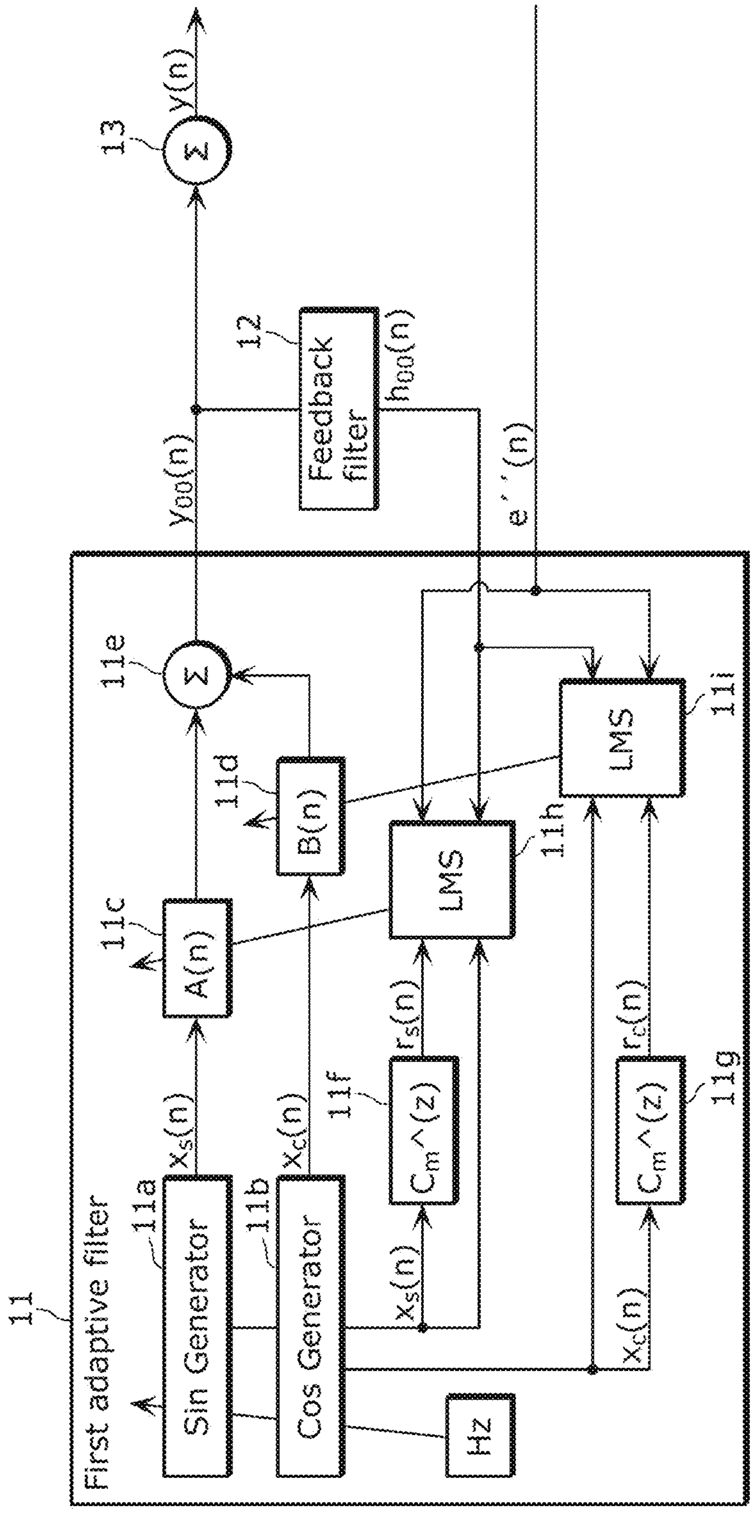
FIG. 7 is a diagram showing a specific configuration of a first adaptive filter.

Next, the specific configuration of first adaptive filter 11 is described. FIG. 7 is a diagram showing the specific configuration of first adaptive filter 11. As shown in FIG. 7, first adaptive filter 11 includes sinusoidal wave generator 11*a*, cosine wave generator 11*b*, first filter 11*c*, second filter 11*d*, adder 11*e*, first corrector 11*f*, second corrector 11*g*, first updater 11*h*, and second updater 11*i*. It should be noted that the specific configuration of first adaptive filter 11 on the upper side of FIG. 6 is described in the following description with reference to FIG. 7. Since first adaptive filter 11 on the lower side of FIG. 6 has the same configuration as first adaptive filter 11 on the upper side, a description thereof is omitted.

Sinusoidal wave generator 11*a* outputs, as a first reference signal, a sinusoidal wave having a preset frequency. In FIG. 7, the first reference signal is denoted by $x_s(n)$. n is an integer greater than or equal to 0 and indicates a sampling number in a discrete time system. The first reference signal is outputted to first filter 11*c*, first corrector 11*f*, and first updater 11*h*.

Cosine wave generator 11*b* outputs, as a second reference signal, a cosine wave having a preset frequency that is the same as that of the sinusoidal wave. In FIG. 7, the second reference signal is denoted by $x_c(n)$. The second reference signal is outputted to second filter 11*d*, second corrector 11*g*, and second updater 11*i*.

First filter 11*c* multiplies the first reference signal outputted from sinusoidal wave generator 11*a* by first filter coefficient A(n). First filter coefficient A(n) is successively updated by first updater 11*h*. A first cancellation signal that is the first reference signal multiplied by first filter coefficient A(n) is outputted to adder 11*e*.

Second filter 11*d* multiplies the second reference signal outputted from cosine wave generator 11*b* by second filter coefficient B(n). Second filter coefficient B(n) is successively updated by second updater 11*i*. A second cancellation signal that is the second reference signal multiplied by second filter coefficient B(n) is outputted to adder 11*e*.

Adder 11*e* adds the first cancellation signal outputted from first filter 11*c* and the second cancellation signal outputted from second filter 11*d*. In FIG. 7, a cancellation signal obtained by adding the first cancellation signal and the second cancellation signal is denoted by $y_{00}(n)$. Adder 11*e* outputs cancellation signal $y_{00}(n)$ to feedback filter 12 and adder 13.

First corrector 11*f* generates a first corrected reference signal by correcting (filtering) the first reference signal using simulated transfer function $C_m\hat{}(z)$. In FIG. 7, the first corrected reference signal is denoted by $r_s(n)$. The first corrected reference signal generated is outputted to first updater 11*h*.

It should be noted that simulated transfer function $C_m\hat{}(z)$ is a transfer function obtained by correcting a transfer function that simulates acoustic transfer function $C_m(z)$ from the position of loudspeaker 52 to the position of microphone 53, in consideration of the frequency characteristics of first band elimination filter 14, first gain adjuster 15, second band elimination filter 16, and second gain adjuster 17. Specifically, simulated transfer function $C_m\hat{}(z)$ is gain and phase (phase delay) for each frequency. For example, simulated transfer function $C_m\hat{}(z)$ is measured in advance for each frequency in a space and stored in the storage unit (not shown in the figure) included in active noise reduction device 10. In other words, the frequencies and the gain and phase for correcting signals of the frequencies are stored in the storage unit.

Second corrector 11*g* generates a second corrected reference signal by correcting (filtering) the second reference signal using simulated transfer function $C_m\hat{}(z)$. In FIG. 7, the second corrected reference signal is denoted by $r_c(n)$. The second corrected reference signal generated is outputted to second updater 11*i*.

First updater 11*h* calculates a first filter coefficient based on the first reference signal obtained from sinusoidal wave generator 11*a*, the first corrected reference signal obtained from first corrector 11*f*, the error signal (e"(n)) outputted by microphone 53, and the output signal ($h_{00}(n)$) of feedback filter 12, and outputs the first feedback filter calculated to first filter 11*c*. Additionally, first updater 11*h* updates the first filter coefficient successively.

Second updater 11*i* calculates a second filter coefficient based on the second reference signal obtained from cosine wave generator 11*b*, the second corrected reference signal obtained from second corrector 11*g*, the error signal obtained from microphone 53, and the output signal obtained from feedback filter 12, and outputs the second feedback filter calculated to second filter 11*d*. In addition, second updater 11*i* updates the second filter coefficient successively.

Hereinafter, LMS updating equations for calculating a first filter coefficient and a second filter coefficient are described. Feedback filter 12 generates output signal $h_{00}(n)$ by multiplying cancellation signal $y_{00}(n)$ by gain coefficient a. $h_{00}(n)$ is expressed by [Math. 7] as below, using [Math. 4].

$$h_{00}(n) = ay_{00}(n) = a\{A(n)x_s(n) + B(n)x_c(n)\} \quad \text{[Math. 7]}$$

The LMS updating equations expressed by [Math. 5] and [Math. 6] are expressed by [Math. 8] and [Math. 9] as below, using [Math. 7].

$$A(n+1) = A(n) - \mu r_s(n)e''(n) - \mu x_s(n)h_{00}(n) = A(n) - \mu r_s(n)e''(n) - \mu x_s(n)a\{A(n)x_s(n) + B(n)x_c(n)\} \quad \text{[Math. 8]}$$

-continued $$B(n+1)=B(n)-\mu r_c(n)e''(n)-\mu x_c(n)h_{00}(n)= B(n)-\mu r_c(n)e''(n)-\mu x_c(n)a\{A(n)x_s(n)+B(n)x_c(n)\} \quad \text{[Math. 9]}$$

As shown in [Math. 8] and [Math. 9] above, gain coefficient a is a coefficient for adjusting a rate of updating filter coefficients A(n) and b (n). Multiplication by gain coefficient a is equivalent to generating cancellation sound $c_m(n)*y(n)$ at the position of microphone 53 in numerical computation. For this reason, it is possible to adjust the stability and the amount of noise reduction of first adaptive filter 11 using a value of gain coefficient a. When gain coefficient a is greater than 0, it is possible to broaden the range of noise reduction characteristics. Here, although the stability of first adaptive filter 11 improves more considerably and it is possible to broaden the range of the noise reduction characteristics more greatly with an increase in value of gain coefficient a, the amount of noise reduction decreases.

[Specific Configuration of First Band Elimination Filter]

Figure 8:
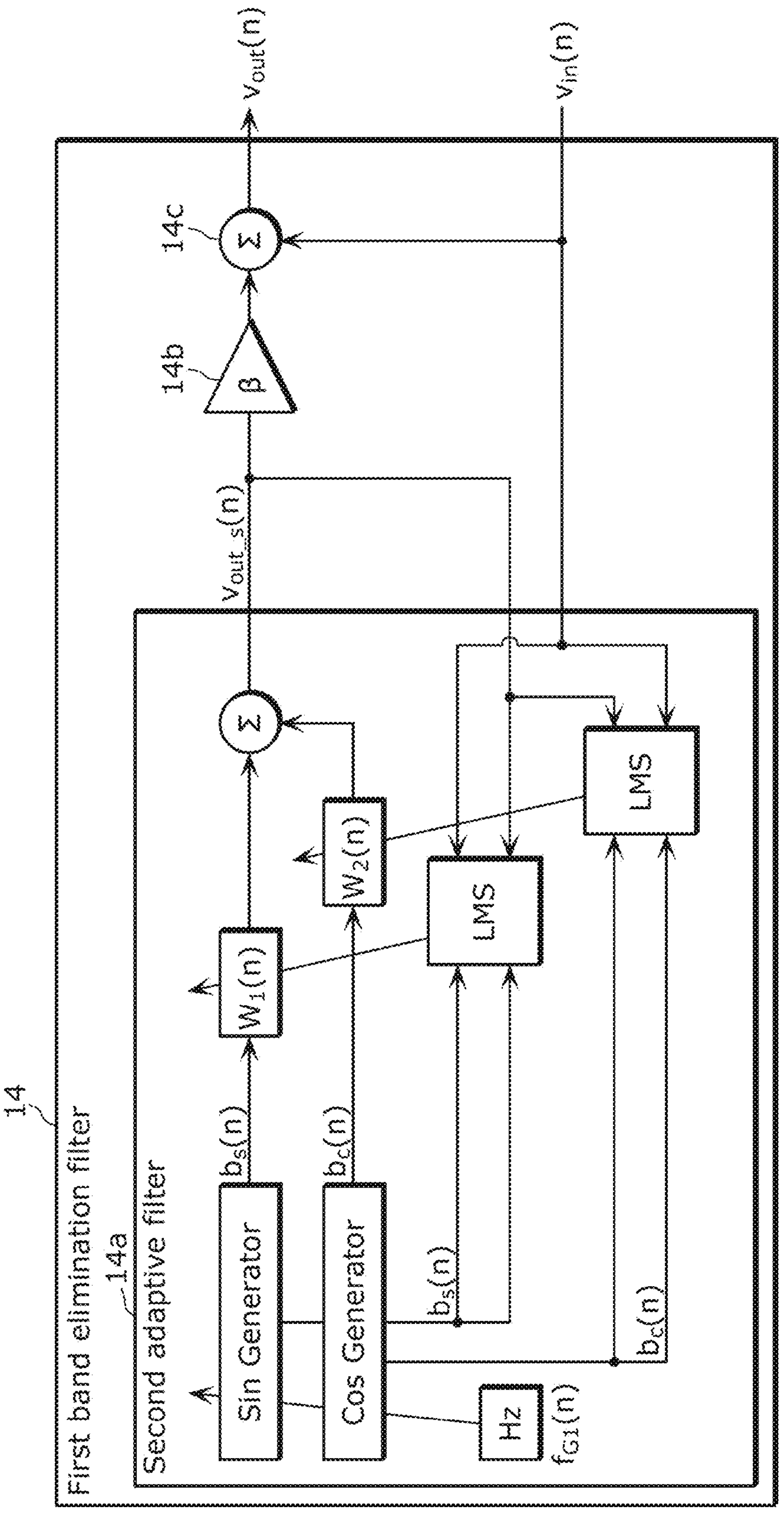
FIG. 8 is a diagram showing a specific configuration of a first band elimination filter.

Next, the specific configuration of first band elimination filter 14 is described. FIG. 8 is a diagram showing the specific configuration of first band elimination filter 14.

First band elimination filter 14 is restated as an equalizer based on the SAN algorithm. First band elimination filter 14 includes second adaptive filter 14*a*, gain adjuster 14*b*, and adder 14*c*.

Second adaptive filter 14*a* applies, to a reference signal having a specific frequency, a filter coefficient successively updated based on input signal $v_{in}(n)$ to first band elimination filter 14, to generate output signal $v_{out}(n)$ from first band elimination filter 14. It should be noted that the configuration of second adaptive filter 14*a* is obtained by removing first corrector 11*f* and second corrector 11*g* from first adaptive filter 11, and $b_s(n)$, $b_c(n)$, $W_1(n)$, and $W_2(n)$ in second adaptive filter 14*a* are equivalent to $x_s(n)$, $x_c(n)$, A(n), and B(n).

Here, when the frequency of a reference signal in second adaptive filter 14*a* is denoted by $f_{G1}$ [Hz], output signal $V_{out\_s}(n)$ from second adaptive filter 14*a* is expressed by [Math. 10] as below. It should be noted that frequency $f_{G1}$ of the reference signal is restated as the center frequency of first band elimination filter 14.

$$v_{out\_s}(n)=W_1(n)b_s(n)+W_2(n)b_c(n) \quad \text{[Math. 10]}$$

In second adaptive filter 14*a*, LMS updating equations for filter coefficients $W_1(n)$ and $W_2(n)$ are expressed by [Math. 11] and [Math. 12] as below.

$$W_1(n+1)=W_1(n)-\mu_{G1}b_s(n)\{v_{in}(n)+v_{out\_s}(n)\} \quad \text{[Math. 11]}$$

$$W_2(n+1)=W_2(n)-\mu_{G1}b_c(n)\{v_{in}(n)+v_{out\_s}(n)\} \quad \text{[Math. 12]}$$

It should be noted that $\mu_{G1}$ denotes a step-size parameter for determining the amount of updating of filter coefficients $W_1(n)$ and $W_2(n)$ per sampling.

Gain adjuster 14*b* multiplies output signal $v_{out\_s}(n)$ by gain coefficient β. Adder 14*c* adds output signal $v_{out\_s}(n)$ multiplied by gain coefficient β and input signal $v_{in}(n)$ to generate output signal $v_{out}(n)$. Output signal $v_{out}(n)$ is expressed by [Math. 13] as below.

$$v_{out}(n)=v_{in}(n)+\beta v_{out\_s}(n) \quad \text{[Math. 13]}$$

Figure 9:
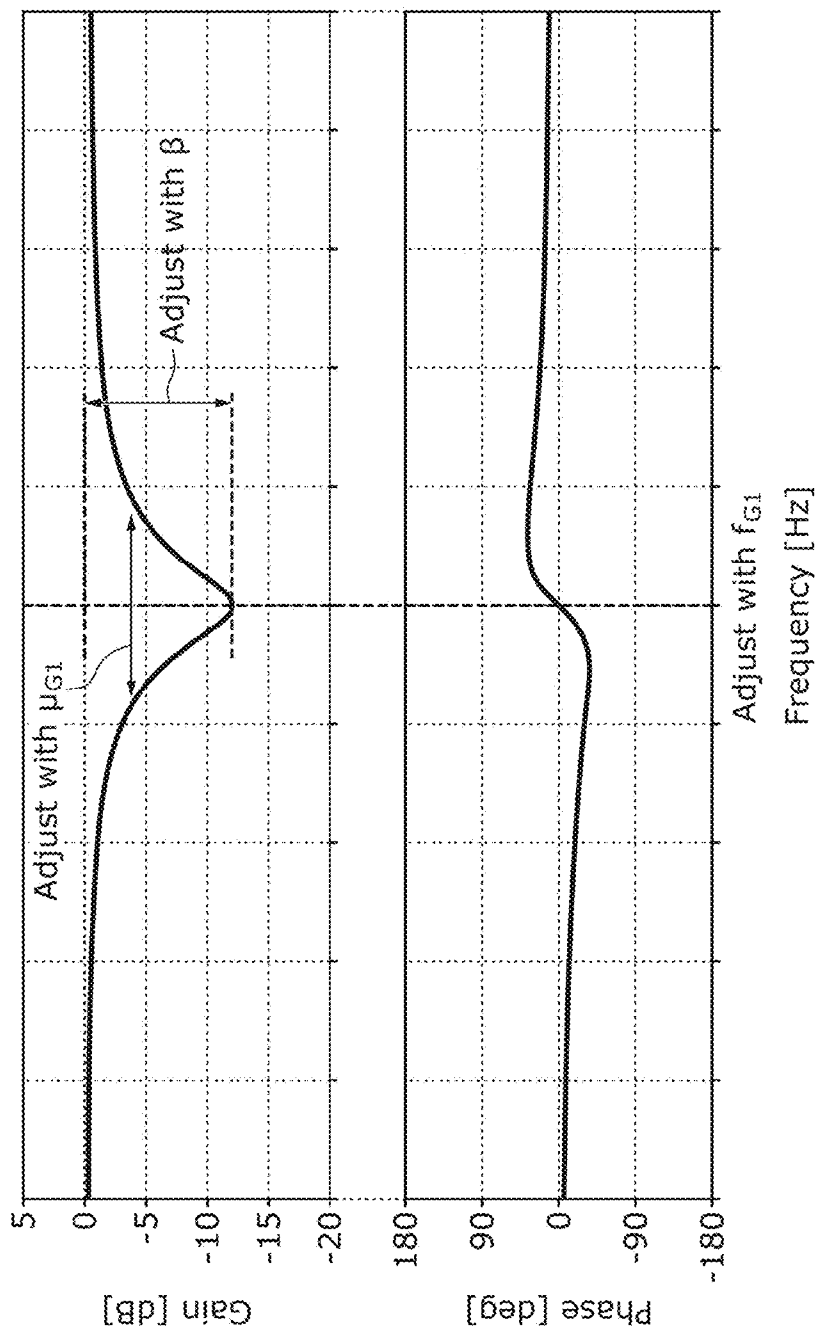
FIG. 9 is a diagram for illustrating adjustment of the characteristics of the first band elimination filter.

Gain coefficient β is a parameter for adjusting the amount of gain level reduction in center frequency $f_{G1}$ in the frequency characteristics of first band elimination filter 14. In other words, it is possible to freely adjust the characteristics of first band elimination filter 14 by changing $f_{G1}$, step-size parameter $\mu_{G1}$, and gain coefficient β. FIG. 9 is a diagram for illustrating adjustment of the characteristics of first band elimination filter 14.

Here, second band elimination filter 16 has the same configuration as first band elimination filter 14, and a description of the specific configuration of second band elimination filter 16 is omitted. Two band elimination filters of first band elimination filter 14 and second band elimination filter 16 are each inserted to moderate the phase characteristics of acoustic transfer function $C_m(z)$.

The two band elimination filters differ in a location to be inserted (the first path or the second path). However, for example, whether both the two band elimination filters are inserted in the first path or the second path, the same effect is achieved in theory.

The reason why the insertion locations of the two band elimination filters are separated is that it is intended to effectively use the dynamic range of a signal on each of a first path side (output side) and a second path side (input side). When a band elimination filter is disposed only on one of the first path side or the second path side and a signal is attenuated due to software constraints, a resolution necessary for controlling noise may not be obtained.

Moreover, as with Variation 1 to Variation 3 described later, there are a case in which the two band elimination filters are individually disposed to correspond to the plurality of first adaptive filters 11 on a one-to-one basis, and a case in which the two band elimination filters are shared (commonalized) by the plurality of first adaptive filters 11. In these cases, it is possible to rationalize design by a band elimination filter being disposed on each of the first path side (output side) and the second path side (input side).

It is possible to freely change the frequency characteristics of acoustic transfer function $C_m(z)$ by combining a plurality of band elimination filters disposed in the first path or the second path. Active noise reduction device 10 may include three or more band elimination filters disposed in the first path or the second path.

It should be noted that although the center frequency (the frequency of the reference signal) of first band elimination filter 14 and the center frequency of second band elimination filter 16 are different, the center frequencies may be the same. For example, when one band elimination filter is incapable of sufficiently attenuating a signal due to software constraints, it is conceivable to use two band elimination filters having the same center frequency.

Figure 10:
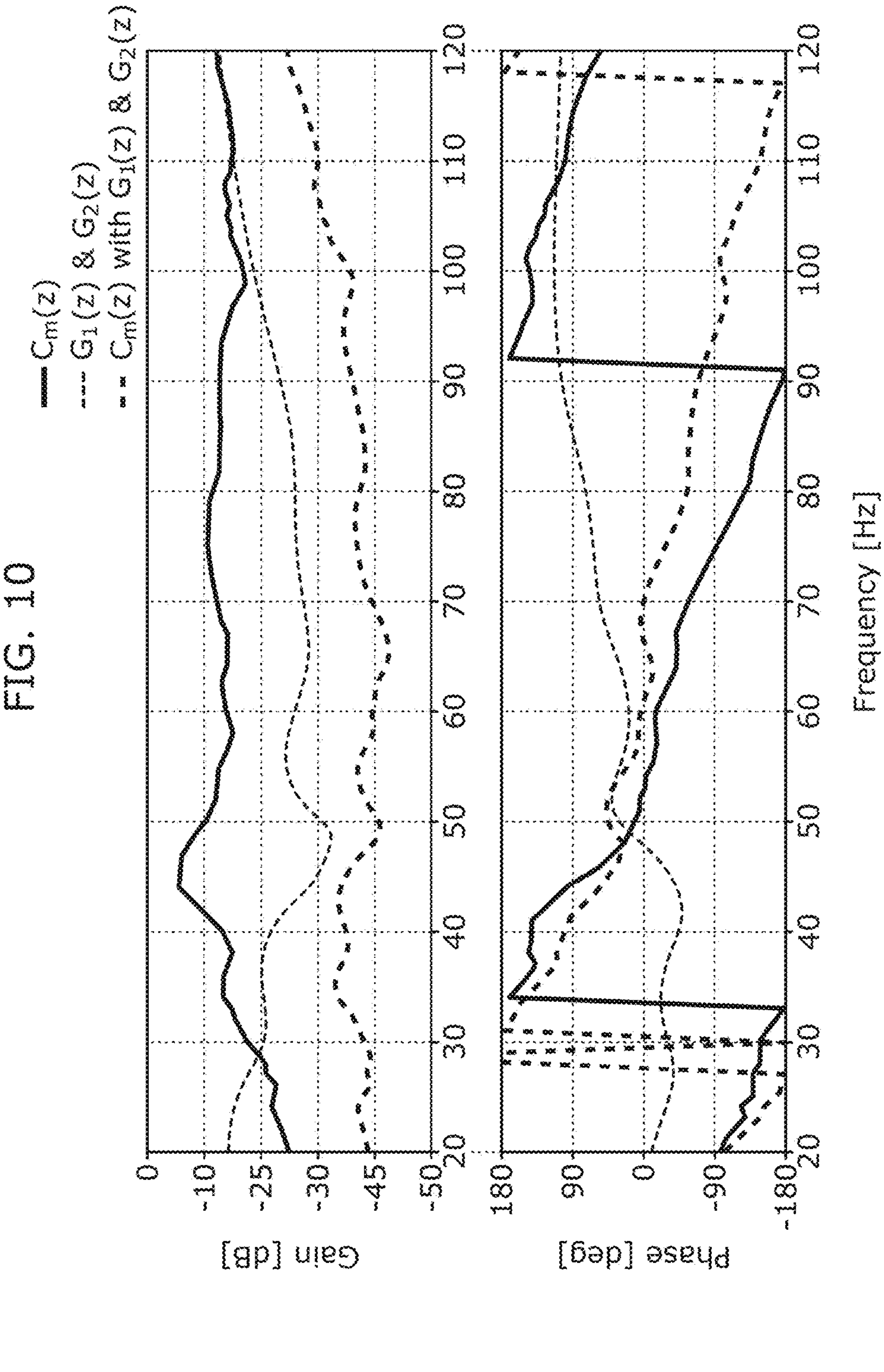
FIG. 10 is a diagram showing a change in frequency characteristics (gain characteristics and phase characteristics) of acoustic transfer function $C_m(z)$ when the first band elimination filter and a second band elimination filter are applied.

Here, since acoustic transfer function $C_m(z)$ includes not only transfer characteristics from loudspeaker 52 to microphone 53 but also the characteristics of a path that passes through first adaptive filter 11, first band elimination filter 14 and second band elimination filter 16 make it possible to change the frequency characteristics of acoustic transfer function $C_m(z)$. FIG. 10 is a diagram showing a change in frequency characteristics (gain characteristics and phase characteristics) of acoustic transfer function $C_m(z)$ when first band elimination filter 14 and second band elimination filter 16 are applied. In the example shown in FIG. 10, a band in which noise is to be reduced is a band ranging from at least 35 Hz to at most 45 Hz, the center frequency of one of first band elimination filter 14 or second band elimination filter 16 is around 31 Hz, and the center frequency of an other of first band elimination filter 14 or second band elimination filter 16 is around 49 Hz.

As shown in FIG. 10, first band elimination filter 14 and second band elimination filter 16 make it possible to moderate the phase characteristics of acoustic transfer function $C_m(z)$. When it is desired to reduce noise in the band ranging from at least 35 Hz to at most 45 Hz, it is possible to reduce the waterbed effect (to be described later) by moderating the phase characteristics of this band.

It should be noted that the gain of $C_m(z)$ is attenuated by first band elimination filter 14 and second band elimination filter 16. For this reason, in active noise reduction device 10, first gain adjuster 15 and second gain adjuster 17 adjust the gain. Accordingly, it is possible to prevent a filter coefficient in first adaptive filter 11 from increasing excessively, and the filter coefficient from being clipped to the upper value due to software constraints.

Figure 11:
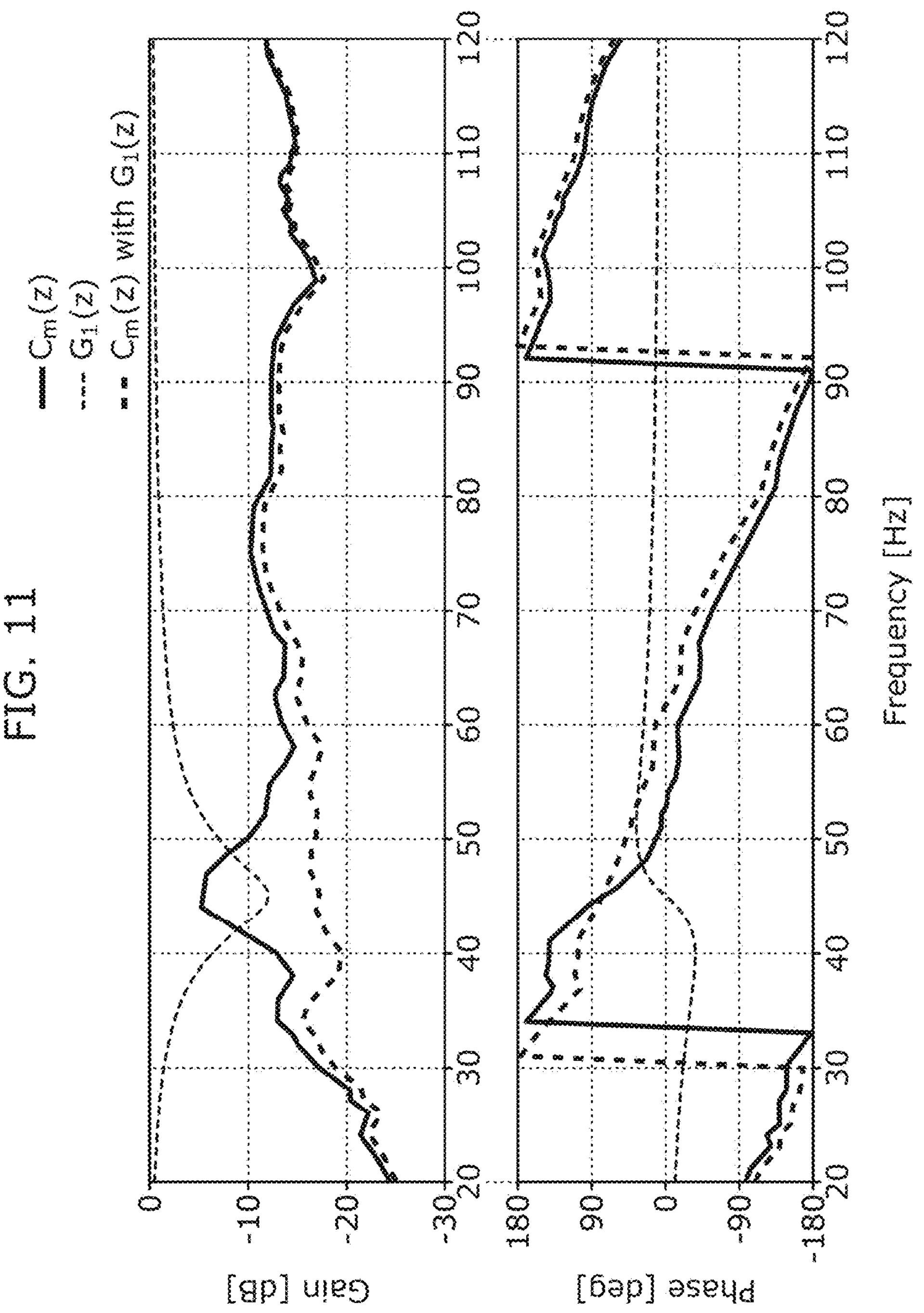
FIG. 11 is a diagram showing a change in frequency characteristics of acoustic transfer function $C_m(z)$ when only one of the first band elimination filter or the second band elimination filter is applied.

Active noise reduction device 10 may include at least one of first band elimination filter 14 or second band elimination filter 16. For example, when active noise reduction device 10 includes only one of first band elimination filter 14 or second band elimination filter 16, and the center frequency of the only one of first band elimination filter 14 or second band elimination filter 16 is 45 Hz, the frequency characteristics of acoustic transfer function $C_m(z)$ change as shown in FIG. 11. FIG. 11 is a diagram showing a change in frequency characteristics of acoustic transfer function $C_m(z)$ when only one of first band elimination filter 14 or second band elimination filter 16 is applied.

As shown in FIG. 11, even when only one of first band elimination filter 14 or second band elimination filter 16 is applied, it is possible to moderate the phase characteristics of acoustic transfer function $C_m(z)$.

It should be noted that, in active noise reduction device 10, each of first band elimination filter 14 and second band elimination filter 16 is achieved by second adaptive filter 14*a* (an adaptive digital filter having one tap). However, first band elimination filter 14 and second band elimination filter 16 may each be achieved by a general digital filter. Since delay occurs on a low frequency side, a band elimination filter achieved by the general digital filter has a large phase variation. For this reason, a band elimination filter achieved by second adaptive filter 14*a* better serves purpose of moderating the phase characteristics of acoustic transfer function $C_m(z)$.

Furthermore, each of first band elimination filter 14 and second band elimination filter 16 may be achieved as hardware including circuit components. In this case, since first band elimination filter 14 and second band elimination filter 16 have a small phase variation although the flexibility of first band elimination filter 14 and second band elimination filter 16 deteriorates, first band elimination filter 14 and second band elimination filter 16 each serve the purpose of moderating the phase characteristics of acoustic transfer function $C_m(z)$.

Advantageous Effects Etc.

Figure 12:
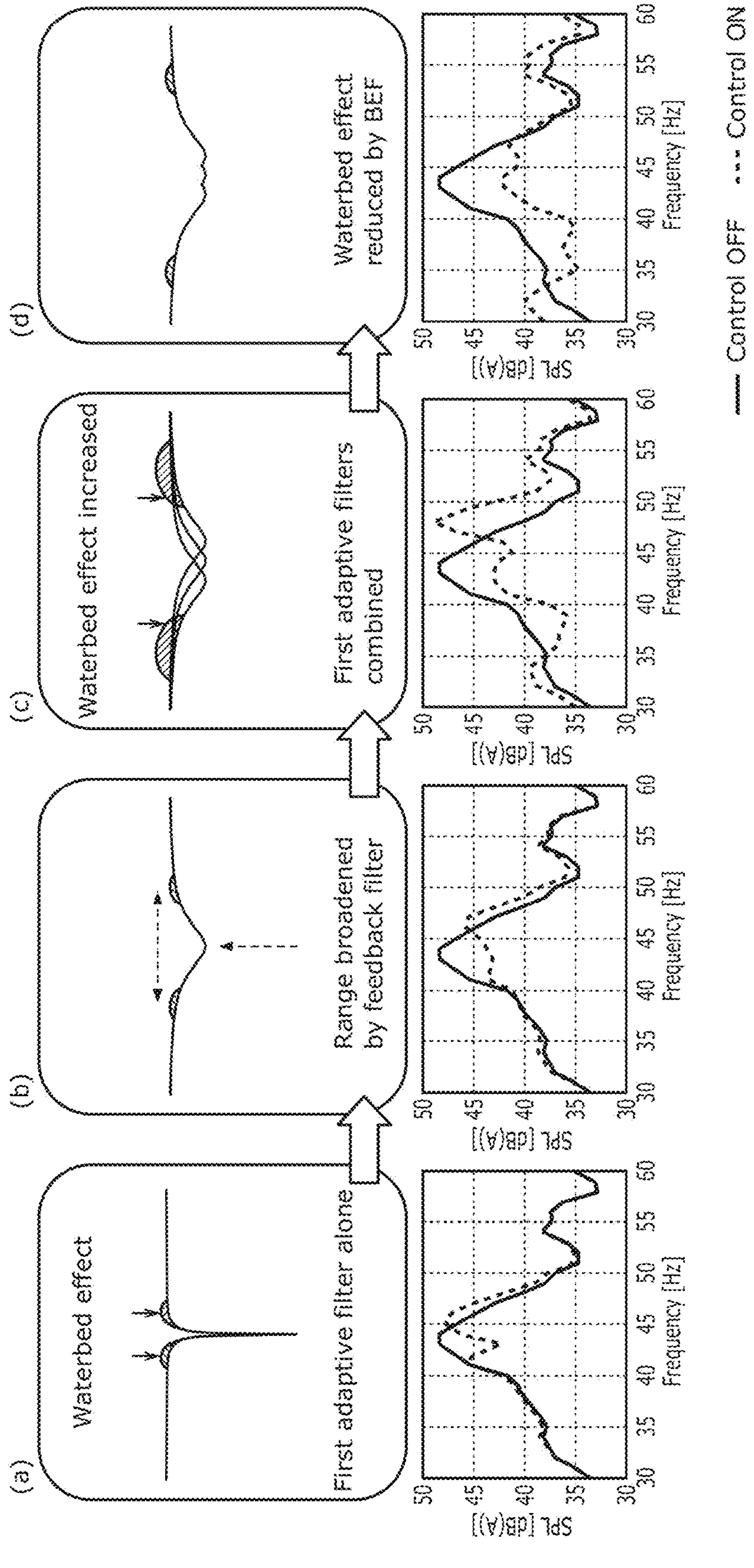
FIG. 12 is a diagram for explaining why the active noise reduction device according to the embodiment is capable of reducing broadband noise.

Active noise reduction device 10 is capable of reducing broadband noise while reducing the waterbed effect. FIG. 12 is a diagram for explaining why active noise reduction device 10 is capable of reducing broadband noise.

(a) of FIG. 12 shows a schematic diagram for noise reduction characteristics in space 51 when an active noise reduction device (corresponding to FIG. 3) including only one first adaptive filter 11 to which feedback filter 12 is not applied is used (upper stage), and frequency characteristics simulation results of a frequency level when the device is turned on or off (lower stage). It should be noted that the horizontal axis for the noise reduction characteristics represents a frequency, and the vertical axis represents the amount of noise reduction (a lower amount means more noise is reduced).

Here, when the range of the noise reduction characteristics of first adaptive filter 11 alone is broadened by applying feedback filter 12 to first adaptive filter 11 in an active noise reduction device corresponding to (a) of FIG. 12, a state shown in (a) of FIG. 12 changes to a state shown in (b) of FIG. 12.

Moreover, the state shown in (b) of FIG. 12 changes to a state shown in (c) of FIG. 12 by combining a plurality of first adaptive filters 11 each having a different center frequency in noise reduction characteristics, in an active noise reduction device corresponding to (b) of FIG. 12. In other words, the range of the noise reduction characteristics is further broadened.

After that, the state shown in (c) of FIG. 12 changes to a state shown in (d) of FIG. 12 by reducing the waterbed effect caused by the broadening described in (b) and (c) of FIG. 12, using first band elimination filter 14 and second band elimination filter 16 in an active noise reduction device corresponding to (c) of FIG. 12. It should be noted that, more specifically, to reduce the waterbed effect means to reduce an increase in noise in a band in which the waterbed effect occurs.

Active noise reduction device 10 is an active noise reduction device corresponding to (d) of FIG. 12. To put it another way, active noise reduction device 10 is capable of reducing broadband noise.

[Types of Noise to Be Reduced]

By changing a frequency set to each of the plurality of first adaptive filters 11 and respective parameters (various parameters such as $\alpha$, $\beta$, $K_1$, and $K_2$) of feedback filter 12, first band elimination filter 14, first gain adjuster 15, second band elimination filter 16, and second gain adjuster 17, active noise reduction device 10 is capable of broadening a frequency range in which noise can be reduced, and shifting the frequency range. Accordingly, active noise reduction device 10 is capable of reducing various noise in space 51 of the vehicle interior.

For example, active noise reduction device 10 is capable of reducing road noise that is broadband noise. In this case, a frequency set to each of the plurality of first adaptive filters 11 (the frequency of a reference signal) is a fixed frequency in consideration of the frequency band of the road noise. How to set a frequency to each of the plurality of first adaptive filters 11 is determined, for example, empirically or experimentally. In addition, the various parameters are also set to be suitable for reducing the road noise. This setting is determined, for example, empirically or experimentally.

Moreover, active noise reduction device 10 is also capable of reducing muffled engine sound that is narrowband noise. In this case, a signal that indicates the rotational frequency of an engine is inputted to each of the plurality of first adaptive filters 11, and the frequency set to each of the plurality of first adaptive filters 11 is dynamically changed according to the rotational frequency of the engine.

At this time, although a frequency itself that is synchronized with the rotational order of the engine may be set to each of the plurality of first adaptive filters 11, a frequency to be set may be shifted to obtain broadband noise reduction characteristics relative to the frequency synchronized with the rotational order of the engine as the center. For example, when active noise reduction device 10 includes three first adaptive filters 11 and a frequency that is synchronized with the rotational order of the engine is denoted by $f_0$, it is conceivable to configure frequencies set to three first adaptive filters 11 as $f_0-\Delta f_E$, $f_0$, and $f_0+\Delta f_E$. It should be noted that $\Delta f_E$ denotes the shift amount of a frequency.

In addition, when the muffled engine sound is reduced, the various parameters are also set to be suitable for reducing the muffled engine sound. This setting is determined, for example, empirically or experimentally.

Figure 13:
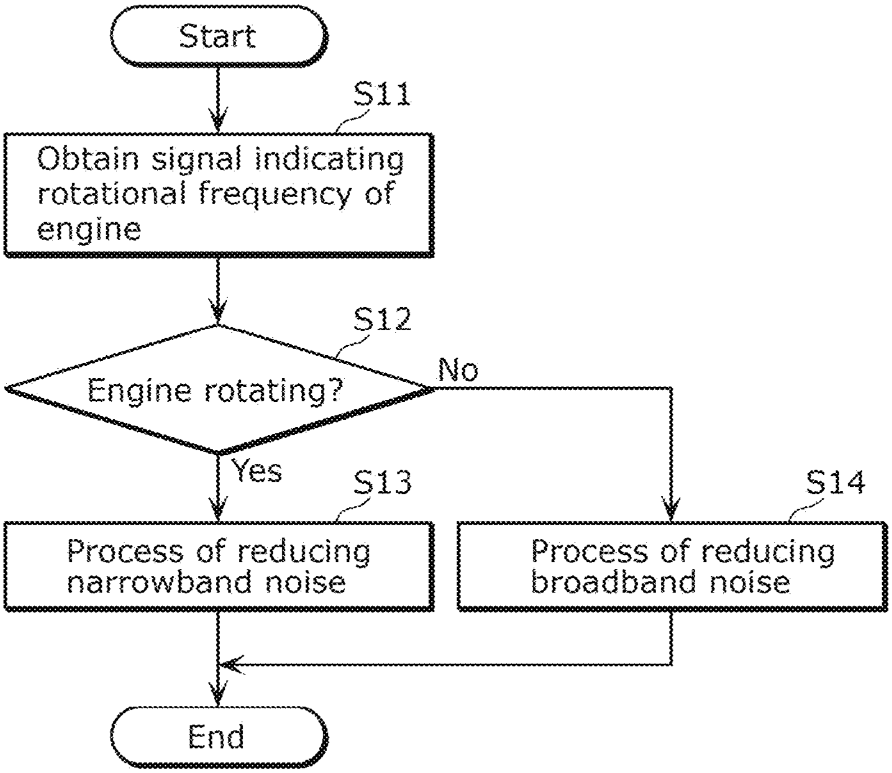
FIG. 13 is a flow chart showing a noise reduction process switching operation.

Furthermore, active noise reduction device 10 may be achieved as a device that is capable of both reducing broadband noise such as road noise and reducing narrowband noise such as muffled engine sound. FIG. 13 is a flow chart showing a noise reduction process switching operation. In the following description of FIG. 13, active noise reduction device 10 is described as including a controller as a functional constituent element that performs a switching operation.

The controller obtains a signal indicating the rotational frequency of the engine from vehicle 50 (S11), and determines whether the engine is rotating, based on the signal obtained (S12). When the controller determines that the engine is rotating (Yes in S12), the controller performs a process of reducing narrowband noise (muffled engine sound) (S13). Specifically, the controller first sets a frequency synchronized with the rotational order of the engine (or a frequency obtained by shifting the frequency to be set) to each of the plurality of first adaptive filters 11, and then sets various parameters for reducing the muffled engine sound. In other words, the controller links the frequency of a reference signal to be processed by each of the plurality of first adaptive filters 11 with the traveling state of vehicle 50.

On the other hand, when the controller determines that the engine is not rotating (No in S12), the controller performs a process of reducing broadband noise (road noise etc.) (S14). Specifically, the controller first sets a fixed frequency to each of the plurality of first adaptive filters 11, and then sets various parameters for reducing the broadband noise. In other words, the controller does not link the frequency of a reference signal to be processed by each of the plurality of first adaptive filters 11 with the traveling state of vehicle 50.

It should be noted that a configuration to reduce road noise when an engine is not rotating is useful in vehicle 50 that travels using a combination of an engine and a motor referred to as a plug-in hybrid vehicle (PHV) or a plug-in hybrid EV (PHEV) etc.

As stated above, active noise reduction device 10 makes it possible to switch between the processes of reducing noise (whether to link the frequency set to each first adaptive filter 11 with the traveling state of vehicle 50).

It should be noted that the processes of reducing noise need not be switched based on the signal indicating the rotational frequency of the engine, and the processes of reducing noise may be switched based on, for example, a signal that indicates an accelerator position or a vehicle speed. In other words, the processes of reducing noise may be switched based on information that indicates the traveling state of vehicle 50 (information that indicates the moving state of the mobile object).

Moreover, the controller may change a frequency range when broadband noise is reduced, based on a signal outputted from a microphone for monitoring noise disposed in space 51. The signal outputted from the microphone for monitoring noise is an example of information that indicates the state of noise in space 51.

Specifically, the controller analyzes a signal outputted from the microphone, identifies a frequency range of noise to be reduced, and changes a frequency set to each of the plurality of first adaptive filters 11 and various parameters to reduce the noise in the frequency range identified. For example, the controller switches whether to set a first setting or a second setting for a frequency of a reference signal to be processed by each of the plurality of first adaptive filters 11, the first setting being for reducing noise in a first frequency range, the second setting being for reducing noise in a second frequency range that is different from the first frequency range.

As stated above, active noise reduction device 10 makes it possible to change (switch) the frequency range when the broadband noise is reduced, based on the state of the noise in space 51.

[Variation 1]

Figure 14:
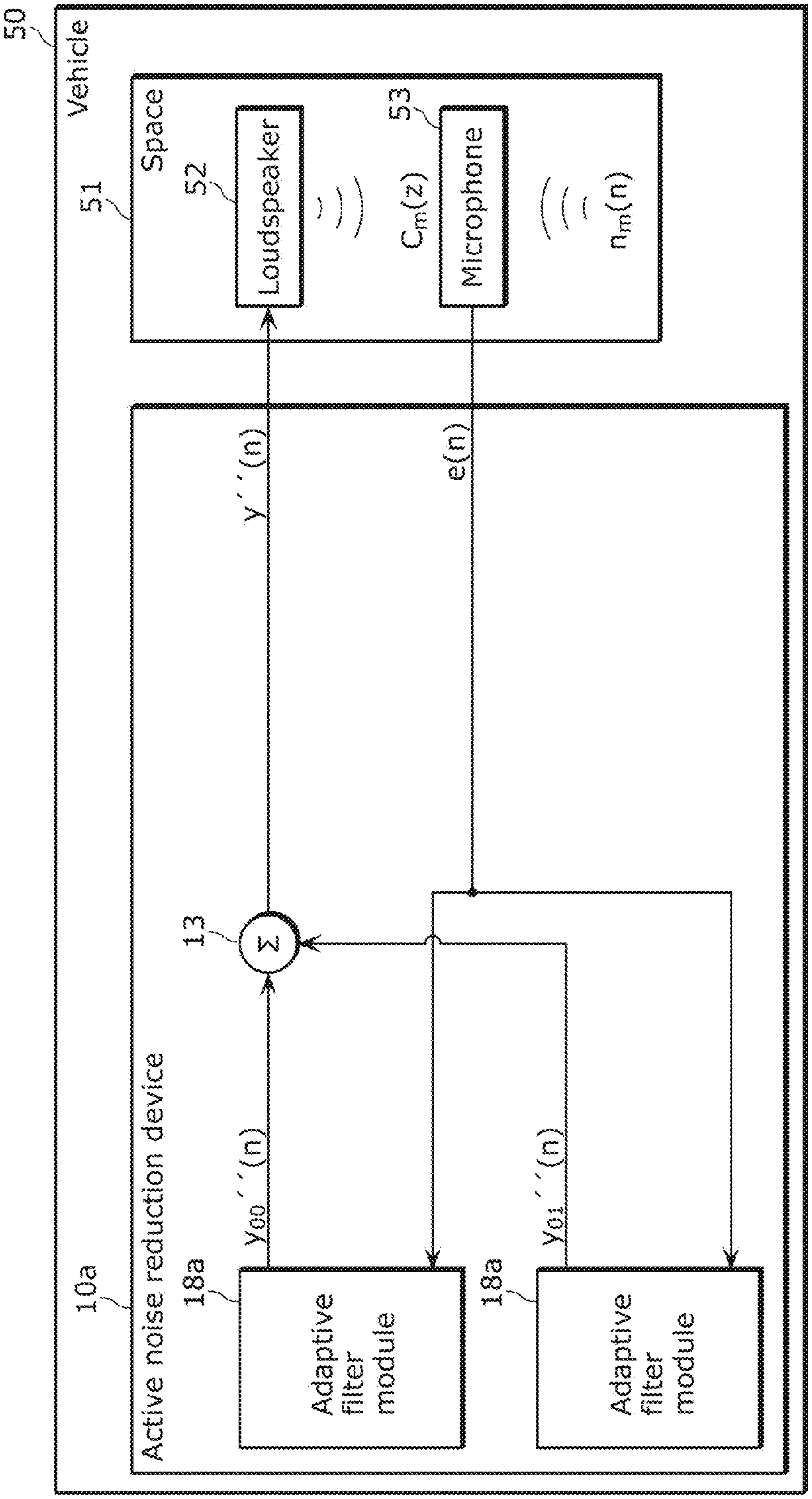
FIG. 14 is a block diagram showing a functional configuration of an active noise reduction device according to Variation 1.

Next, an active noise reduction device according to Variation 1 is described. FIG. 14 is a block diagram showing a functional configuration of the active noise reduction device according to Variation 1.

Active noise reduction device 10*a* according to Variation 1 is achieved by, for example, a microprocessor such as a microcontroller or a DSP, and a storage unit. As shown in FIG. 14, active noise reduction device 10*a* specifically includes: a plurality of adaptive filter modules 18*a*; and adder 13 that adds cancellation signals ($y_{00}''(n)$ and $y_{01}''(n)$) each outputted by a corresponding one of the plurality of adaptive filter modules 18*a*, and outputs a cancellation signal ($y''(n)$) resulting from the addition. Although these constituent elements are achieved by the microcontroller executing a computer program (software) stored in the storage unit, part of the constituent elements may be achieved by hardware (a circuit). In the example shown in FIG. 14, although active noise reduction device 10*a* includes two adaptive filter modules 18*a*, active noise reduction device 10*a* may include three or more adaptive filter modules 18*a*.

Figure 15:
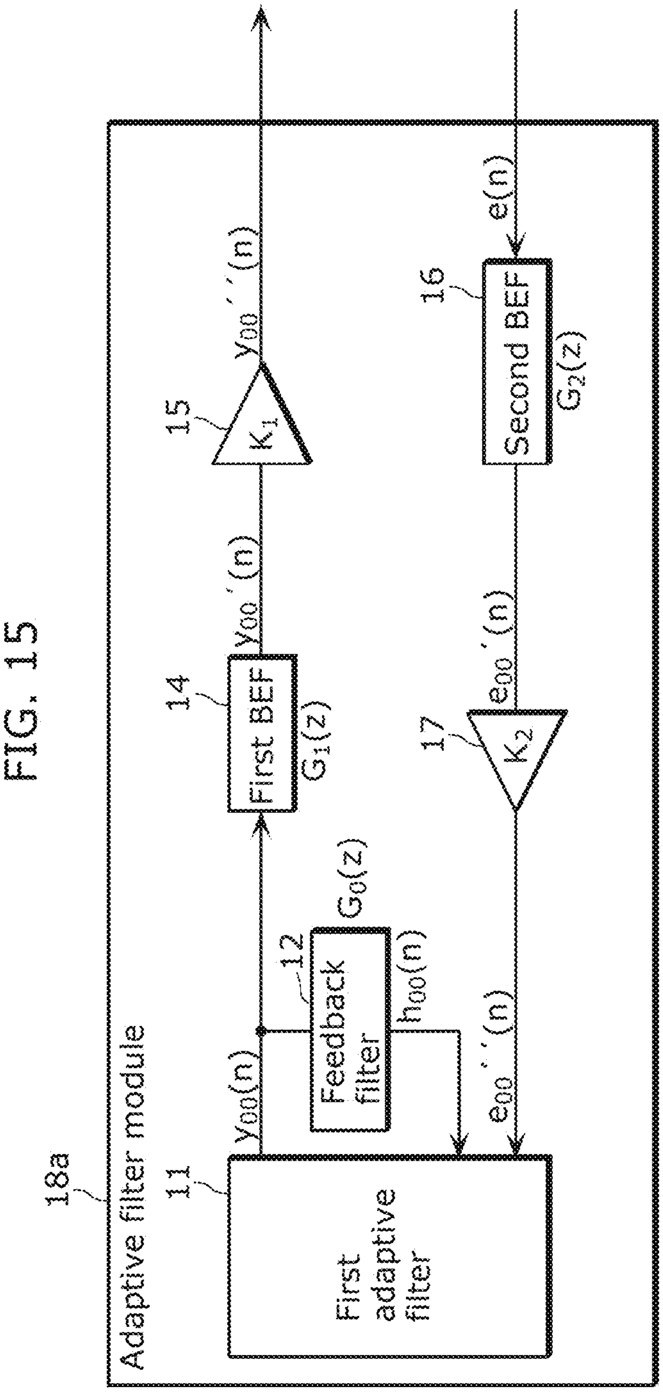
FIG. 15 is a block diagram showing a functional configuration of an adaptive filter module according to Variation 1.

FIG. 15 is a block diagram showing a functional configuration of adaptive filter module 18*a*. As shown in FIG. 15, adaptive filter module 18*a* includes first adaptive filter 11, feedback filter 12, first band elimination filter 14, first gain adjuster 15, second band elimination filter 16, and second gain adjuster 17. In other words, first adaptive filter 11 corresponds to first band elimination filter 14, first gain adjuster 15, second band elimination filter 16, and second gain adjuster 17 on a one-to-one basis.

As described above, active noise reduction device 10*a* includes the plurality of adaptive filter modules 18*a*. Accordingly, it can be said that active noise reduction device 10*a* includes a plurality of first band elimination filters 14 that are disposed in a first path and correspond to the plurality of first adaptive filters 11 on a one-to-one basis. The same applies to first gain adjuster 15.

Additionally, it can be said that active noise reduction device 10*a* includes a plurality of second band elimination filters 16 that are disposed in a second path and correspond to the plurality of first adaptive filters 11 on a one-to-one basis. The same applies to second gain adjuster 17.

In such active noise reduction device 10*a*, it is possible to perform, for each of the plurality of first adaptive filters 11, separate settings on first band elimination filter 14, first gain adjuster 15, second band elimination filter 16, and second gain adjuster 17. It should be noted that active noise reduction device 10*a* is capable of performing the same operations as active noise reduction device 10.

[Variation 2]

Figure 16:
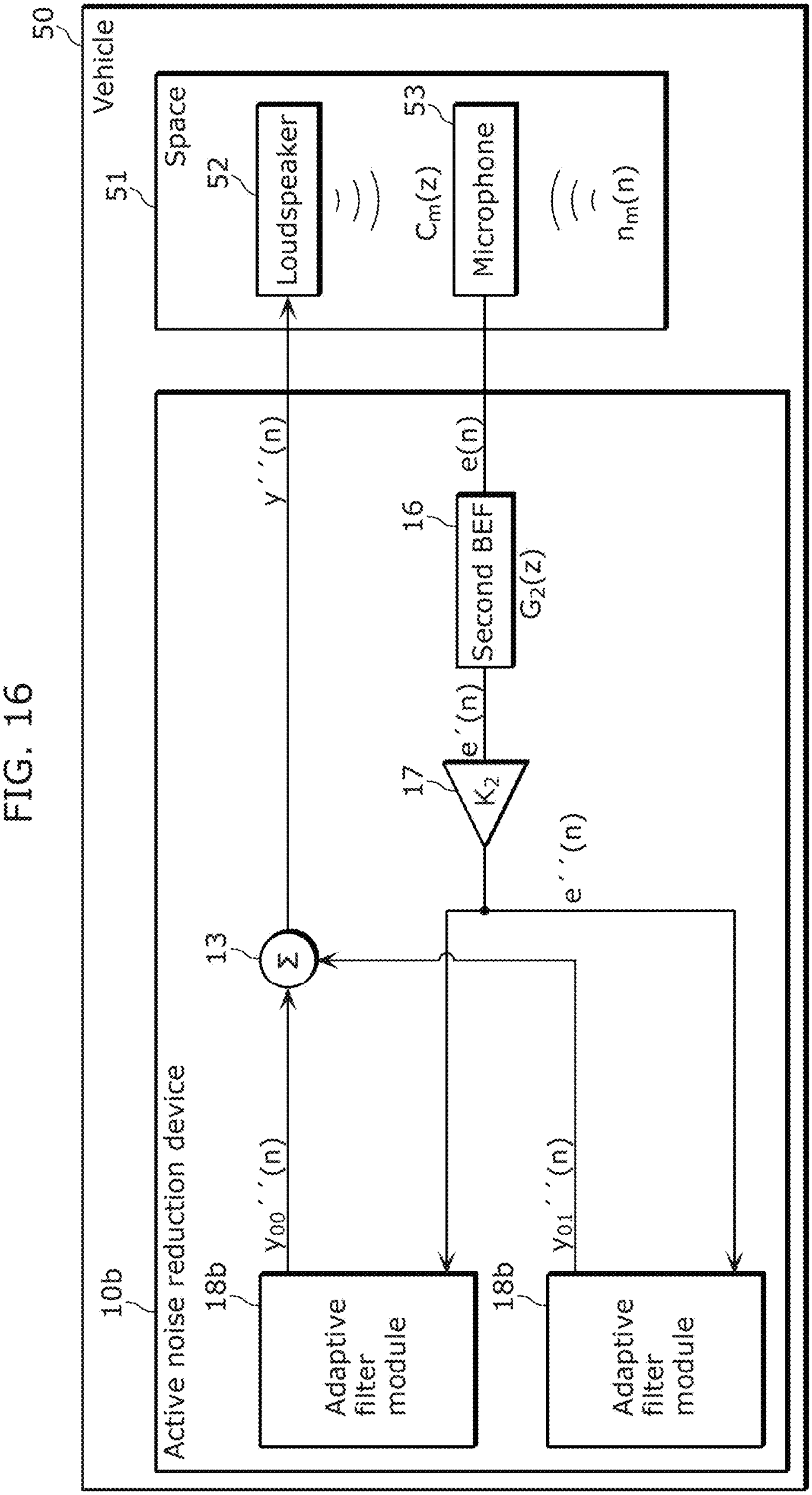
FIG. 16 is a block diagram showing a functional configuration of an active noise reduction device according to Variation 2.

Next, an active noise reduction device according to Variation 2 is described. FIG. 16 is a block diagram showing a functional configuration of the active noise reduction device according to Variation 2.

Active noise reduction device 10*b* according to Variation 2 is achieved by, for example, a microprocessor such as a microcontroller or a DSP, and a storage unit. As shown in FIG. 16, active noise reduction device 10*b* includes: a plurality of adaptive filter modules 18*b*; adder 13 that adds cancellation signals ($y_{00}''(n)$ and $y_{01}''(n)$) each outputted by a corresponding one of the plurality of adaptive filter modules 18*b*, and outputs a cancellation signal ($y''(n)$) resulting from the addition; second band elimination filter 16; and second gain adjuster 17. Although these constituent elements are achieved by the microcontroller executing a computer program (software) stored in the storage unit, part of the constituent elements may be achieved by hardware (a circuit). In the example shown in FIG. 16, although active noise reduction device 10*b* includes two adaptive filter modules 18*b*, active noise reduction device 10*b* may include three or more adaptive filter modules 18*b*.

Figure 17:
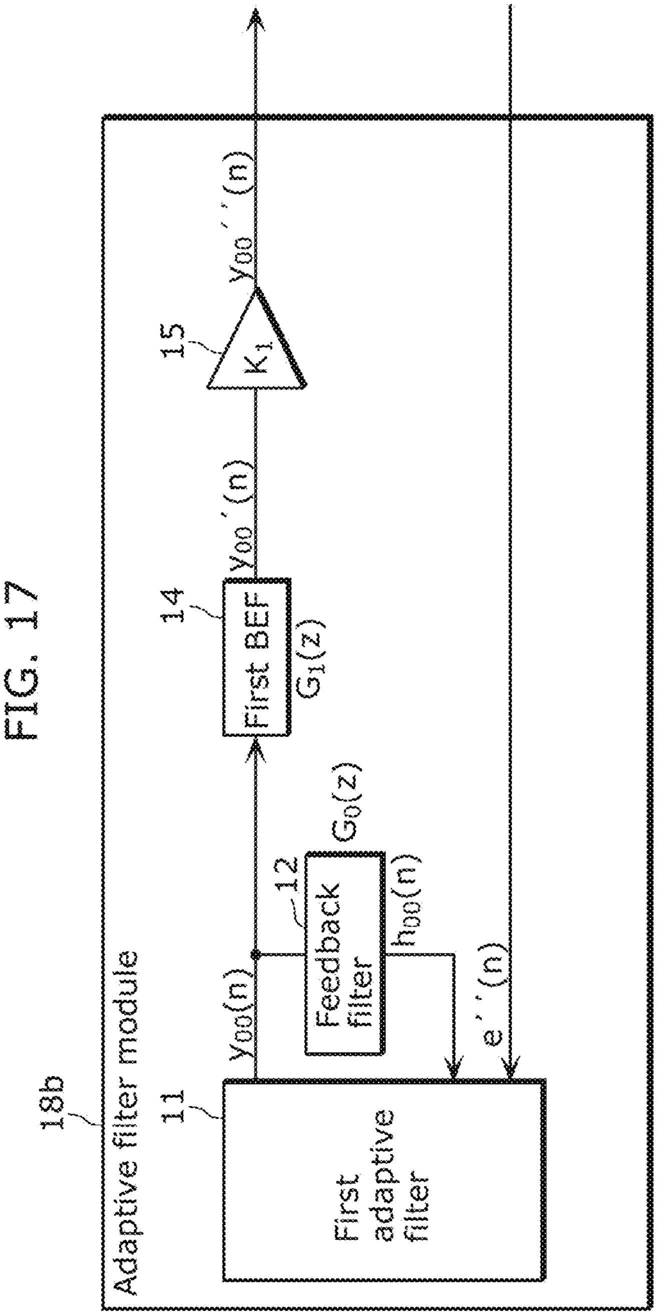
FIG. 17 is a block diagram showing a functional configuration of an adaptive filter module according to Variation 2.

FIG. 17 is a block diagram showing a functional configuration of adaptive filter module 18*b*. As shown in FIG. 17, adaptive filter module 18*b* includes first adaptive filter 11, feedback filter 12, first band elimination filter 14, and first gain adjuster 15. In other words, first adaptive filter 11 corresponds to first band elimination filter 14 and first gain adjuster 15 on a one-to-one basis.

As described above, active noise reduction device 10*b* includes the plurality of adaptive filter modules 18*b*. Accordingly, it can be said that active noise reduction device 10*b* includes a plurality of first band elimination filters 14 that are disposed in a first path and correspond to the plurality of first adaptive filters 11 on a one-to-one basis. The same applies to first gain adjuster 15.

Additionally, it can be said that active noise reduction device 10*b* includes single second band elimination filter 16 that is disposed in a second path and common to the plurality of first adaptive filters 11. The same applies to second gain adjuster 17.

In such active noise reduction device 10*b*, it is possible to perform, for each of the plurality of first adaptive filters 11, separate settings on first band elimination filter 14 and first gain adjuster 15. In addition, in active noise reduction device 10*b*, it is possible to commonalize, for the plurality of first adaptive filters 11, settings of second band elimination filter 16 and second gain adjuster 17. It should be noted that active noise reduction device 10*b* is capable of performing the same operations as active noise reduction device 10.

[Variation 3]

Figure 18:
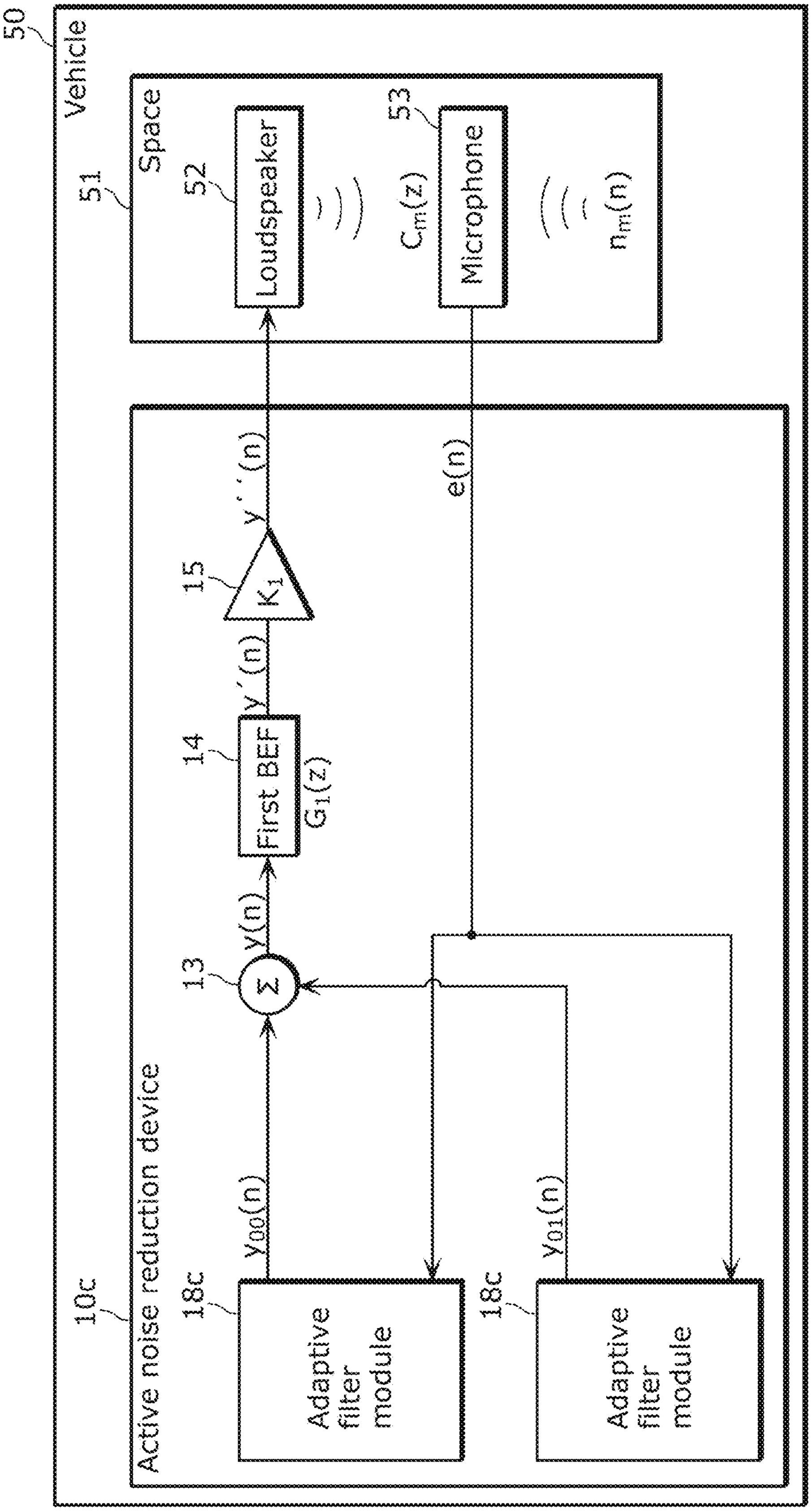
FIG. 18 is a block diagram showing a functional configuration of an active noise reduction device according to Variation 3.

Next, an active noise reduction device according to Variation 3 is described. FIG. 18 is a block diagram showing a functional configuration of the active noise reduction device according to Variation 3.

Active noise reduction device 10*c* according to Variation 3 is achieved by, for example, a microprocessor such as a microcontroller or a DSP, and a storage unit. As shown in FIG. 18, active noise reduction device 10*c* specifically includes: a plurality of adaptive filter modules 18*c*; adder 13 that adds cancellation signals ($y_{00}(n)$ and $y_{01}(n)$) each outputted by a corresponding one of the plurality of adaptive filter modules 18*c*, and outputs a cancellation signal ($y(n)$) resulting from the addition; first band elimination filter 14; and first gain adjuster 15. Although these constituent elements are achieved by the microcontroller executing a computer program (software) stored in the storage unit, part of the constituent elements may be achieved by hardware (a circuit). In the example shown in FIG. 18, although active noise reduction device 10*c* includes two adaptive filter modules 18*c*, active noise reduction device 10*c* may include three or more adaptive filter modules 18*c*.

Figure 19:
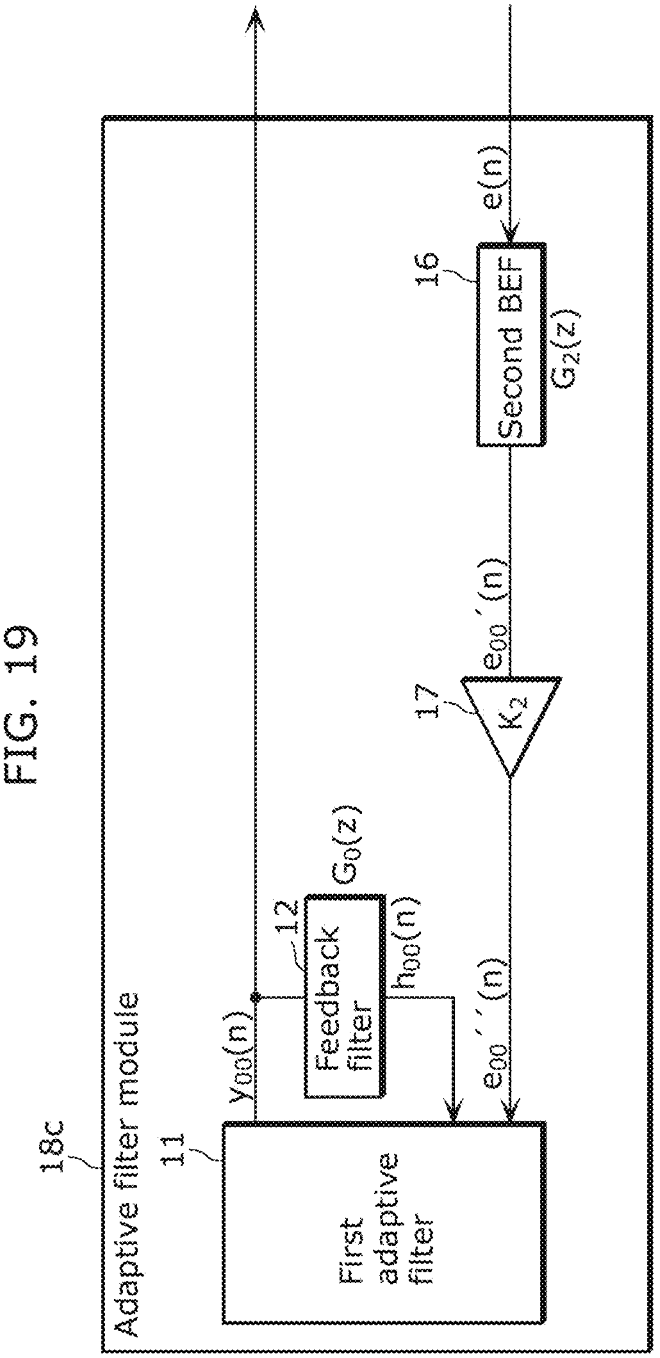
FIG. 19 is a block diagram showing a functional configuration of an adaptive filter module according to Variation 3.

FIG. 19 is a block diagram showing a functional configuration of adaptive filter module 18*c*. As shown in FIG. 19, adaptive filter module 18*c* includes first adaptive filter 11, feedback filter 12, second band elimination filter 16, and second gain adjuster 17. In other words, first adaptive filter 11 corresponds to second band elimination filter 16 and second gain adjuster 17 on a one-to-one basis.

As described above, active noise reduction device 10*c* includes the plurality of adaptive filter modules 18*c*. Accordingly, it can be said that active noise reduction device 10*c* includes a plurality of second band elimination filters 16 that are disposed in a second path and correspond to the plurality of first adaptive filters 11 on a one-to-one basis. The same applies to second gain adjuster 17.

Additionally, it can be said that active noise reduction device 10*c* includes single first band elimination filter 14 that is disposed in a first path and common to the plurality of first adaptive filters 11. The same applies to first gain adjuster 15.

In such active noise reduction device 10*c*, it is possible to perform, for each of the plurality of first adaptive filters 11, separate settings on second band elimination filter 16 and second gain adjuster 17. In addition, in active noise reduction device 10*c*, it is possible to commonalize, for the plurality of first adaptive filters 11, settings of first band elimination filter 14 and first gain adjuster 15. It should be noted that active noise reduction device 10*c* is capable of performing the same operations as active noise reduction device 10.

Advantageous Effects Etc.

As described above, active noise reduction device 10 is an active noise reduction device that reduces noise in space 51 in which loudspeaker 52 and microphone 53 are disposed, by outputting cancellation sound from loudspeaker 52. Active noise reduction device 10 includes: a plurality of first adaptive filters 11 each of which outputs a cancellation signal used to output the cancellation sound by applying a filter coefficient to a reference signal having a specific frequency, the filter coefficient being successively updated based on an error signal outputted from microphone 53; a plurality of feedback filters 12 each of which multiplies the cancellation signal outputted by one of the plurality of first adaptive filters 11 corresponding to feedback filter 12 by a gain coefficient, and outputs the cancellation signal multiplied by the gain coefficient to first adaptive filter 11; adder 13 that adds the cancellation signal outputted by each of the plurality of first adaptive filters 11, and outputs a cancellation signal resulting from the addition; and a band elimination filter that is disposed in at least one of a first path from each of the plurality of first adaptive filters 11 to loudspeaker 52 or a second path from microphone 53 to each of the plurality of first adaptive filters 11.

Such active noise reduction device 10 is capable of increasing the flexibility of a frequency range that makes it possible to reduce noise.

Moreover, for example, active noise reduction device 10 further includes a gain adjuster that is disposed in the at least one of the first path or the second path.

Such active noise reduction device 10 makes it possible to prevent a filter coefficient in first adaptive filter 11 from increasing excessively, and the filter coefficient from being clipped to the upper value due to software constraints.

Furthermore, for example, the gain adjuster is disposed in each of the first path and the second path.

Such active noise reduction device 10 makes it possible to prevent the filter coefficient in first adaptive filter 11 from increasing excessively, taking the dynamic range of a signal on each of a first path side (output side) and a second path side (input side) into account.

Moreover, for example, the band elimination filter is disposed in each of the first path and the second path.

Such active noise reduction device 10 makes it possible to moderate the phase characteristics of acoustic transfer function $C_m(z)$, taking the dynamic range of the signal on each of the first path side (output side) and the second path side (input side) into account.

Furthermore, for example, the band elimination filter is configured by second adaptive filter 14*a*. Second adaptive filter 14*a* applies a filter coefficient to a reference signal having a specific frequency to generate an output signal from the band elimination filter, the filter coefficient being successively updated based on an input signal to the band elimination filter. Such active noise reduction device 10 makes it possible to moderate the phase characteristics of acoustic transfer function $C_m(z)$.

Moreover, for example, active noise reduction device 10 includes a plurality of band elimination filters each of which is the band elimination filter. A frequency of a reference signal to be processed by one of a plurality of second adaptive filters 14*a* corresponding to the plurality of band elimination filters is different from a frequency of a reference signal to be processed by an other one of the plurality of second adaptive filters 14*a*, the plurality of second adaptive filters 14*a* each being the second adaptive filter.

Such active noise reduction device 10 makes it possible to moderate the phase characteristics of acoustic transfer function $C_m(z)$, using a combination of a plurality of band elimination filters each of which has a different center frequency.

Furthermore, for example, a frequency of a reference signal to be processed by one of the plurality of first adaptive filters 11 is different from a frequency of a reference signal to be processed by an other one of the plurality of first adaptive filters 11.

Such active noise reduction device 10 makes it possible to broaden the range of noise reduction characteristics, using a combination of the plurality of first adaptive filters 11.

Moreover, for example, active noise reduction device 10*a* includes a plurality of first band elimination filters 14 and a plurality of second band elimination filters 16 as the band elimination filter, the plurality of first band elimination filters 14 being disposed in the first path and corresponding to the plurality of first adaptive filters 11 on a one-to-one basis, the plurality of second band elimination filters 16 being disposed in the second path and corresponding to the plurality of first adaptive filters 11 on a one-to-one basis.

In such active noise reduction device 10*a*, it is possible to perform, for each of the plurality of first adaptive filters 11, separate settings on first band elimination filter 14 and second band elimination filter 16.

Furthermore, for example, active noise reduction device 10*b* includes a plurality of first band elimination filters 14 and a second band elimination filter 16 as the band elimination filter, the plurality of first band elimination filters 14 being disposed in the first path and corresponding to the plurality of first adaptive filters 11 on a one-to-one basis, the second band elimination filter 16 being disposed in the second path and common to the plurality of first adaptive filters 11.

In such active noise reduction device 10*b*, it is possible to perform, for each of the plurality of first adaptive filters 11, separate settings on first band elimination filter 14. In addition, in active noise reduction device 10*b*, it is possible to commonalize, for the plurality of first adaptive filters 11, settings of second band elimination filter 16.

Moreover, for example, active noise reduction device 10*c* includes a first band elimination filter 14 and a plurality of second band elimination filters 16 as the band elimination filter, the first band elimination filter 14 being disposed in the first path and common to the plurality of first adaptive filters 11, the plurality of second band elimination filters 16 being disposed in the second path and corresponding to the plurality of first adaptive filters 11 on a one-to-one basis.

In such active noise reduction device 10*c*, it is possible to perform, for each of the plurality of first adaptive filters 11, separate settings on second band elimination filter 16. In addition, in active noise reduction device 10*c*, it is possible to commonalize, for the plurality of first adaptive filters 11, settings of first band elimination filter 14.

Furthermore, for example, space 51 is a space in a mobile object, and active noise reduction device 10 includes a controller that obtain information that indicates a moving state of the mobile object. The controller switches whether to link a frequency of a reference signal to be processed by each of the plurality of first adaptive filters 11 with the moving state of the mobile object, based on the information indicating the moving state of the mobile object obtained.

Such active noise reduction device 10 makes it possible to switch between a process of reducing narrowband noise and a process of reducing broadband noise.

Moreover, for example, active noise reduction device 10 includes a controller that obtains information that indicates a state of the noise. The controller switches whether to set a first setting or a second setting for a frequency of a reference signal to be processed by each of the plurality of first adaptive filters, based on the information indicating the state of the noise obtained, the first setting being for reducing noise in a first frequency range, the second setting being for reducing noise in a second frequency range that is different from the first frequency range.

Such active noise reduction device 10 makes it possible to change a frequency range in which noise is reduced.

Furthermore, the mobile object includes active noise reduction device 10 (or active noise reduction device 10*a*, 10*b*, or 10*c*), loudspeaker 52, and microphone 53.

In a space in such a mobile object, the flexibility of a frequency range in which noise can be reduced is increased.

Other Embodiments

Although the embodiment has been described above, the present disclosure is not limited to the aforementioned embodiment.

For example, the active noise reduction device according to the aforementioned embodiment may be mounted on a mobile object other than a vehicle. The mobile object may be, for example, an aircraft or a watercraft. In addition, the present disclosure may be realized as such a mobile object other than a vehicle.

Moreover, the configuration of the active noise reduction device according to the aforementioned embodiment is one example. For example, the active noise reduction device may include constituent elements such as a D/A converter, a low-pass filter (LPF), a high-pass filter (HPF), a power amplifier, or an A/D converter.

Furthermore, the processing performed by the active noise reduction device according to the aforementioned embodiment is one example. For example, part of the processing described in the aforementioned embodiment may be achieved not by digital signal processing but by analog signal processing.

Moreover, for example, in the aforementioned embodiment, processing executed by a specific processing unit may be executed by another processing unit. Additionally, the order of a plurality of processing steps may be changed, or the plurality of processing steps may be executed in parallel.

Furthermore, general or specific aspects of the present disclosure may be realized by a system, a device, a method, an integrated circuit, a computer program, or a computer-readable non-transitory recording medium such as a CD-ROM. In addition, the general or specific aspects may be realized by any combination of a system, a device, a method, an integrated circuit, a computer program, and a computer-readable non-transitory recording medium.

For example, the present disclosure may be realized as a noise reduction method executed by a computer such as an active noise reduction device (DSP), and may be realized as a program for causing a computer (DSP) to execute an active noise reduction method. Additionally, the present disclosure may be realized as a noise reduction system including the active noise reduction device according to the aforementioned embodiment, a loudspeaker (sound output device), and a microphone (sound collecting device).

Moreover, the order of the plurality of processing steps included in the operations of the active noise reduction device described in the aforementioned embodiment is one example. The order of the processing steps may be changed, or the plurality of processing steps may be executed in parallel.

Forms obtained by various modifications to the aforementioned embodiment that can be conceived by a person skilled in the art as well as forms realized by combining any of the constituent elements and functions in the aforementioned embodiment as long as they are within the spirit of the present disclosure are included in the present disclosure.

INDUSTRIAL APPLICABILITY

The active noise reduction device according to the present disclosure is useful as, for example, a device that reduces noise in a vehicle interior.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings and claims are incorporated herein by reference in their entirety: Japanese Patent Application No. 2022-053368 filed Mar. 29, 2022, and PCT International Application No. PCT/JP2023/003283 filed on Feb. 1, 2023.

The invention claimed is:

1. An active noise reduction device that reduces noise in a space in which a loudspeaker and a microphone are disposed, by outputting cancellation sound from the loudspeaker, the active noise reduction device comprising:

a plurality of first adaptive filters each of which outputs a cancellation signal used to output the cancellation sound by applying a filter coefficient to a reference signal having a specific frequency, the filter coefficient being successively updated based on an error signal outputted from the microphone;

a plurality of feedback filters each of which multiplies the cancellation signal outputted by one of the plurality of first adaptive filters corresponding to the feedback filter by a gain coefficient, and outputs the cancellation signal multiplied by the gain coefficient to the first adaptive filter;

an adder that adds the cancellation signal outputted by each of the plurality of first adaptive filters, and outputs a cancellation signal resulting from the addition; and a band elimination filter that is disposed in each of a first path from each of the plurality of first adaptive filters to the loudspeaker and a second path from the microphone to each of the plurality of first adaptive filters, the band elimination filter comprising: a plurality of first band elimination filters and a plurality of second band elimination filters, the plurality of first band elimination filters being disposed in the first path and corresponding to the plurality of first adaptive filters on a one-to-one basis, the plurality of second band elimination filters being disposed in the second path and corresponding to the plurality of first adaptive filters on a one-to-one basis.

2. The active noise reduction device according to claim 1, further comprising:

a gain adjuster that is disposed in the at least one of the first path or the second path.

3. The active noise reduction device according to claim 2, wherein the gain adjuster is disposed in each of the first path and the second path.

4. The active noise reduction device according to claim 1, wherein the band elimination filter is configured by a second adaptive filter, and the second adaptive filter applies a filter coefficient to a reference signal having a specific frequency to generate an output signal from the band elimination filter, the filter coefficient being successively updated based on an input signal to the band elimination filter.

5. The active noise reduction device according to claim 4, comprising:

a plurality of band elimination filters each of which is the band elimination filter, wherein a frequency of a reference signal to be processed by one of a plurality of second adaptive filters corresponding to the plurality of band elimination filters is different from a frequency of a reference signal to be processed by an other one of the plurality of second adaptive filters, the plurality of second adaptive filters each being the second adaptive filter.

6. The active noise reduction device according to claim 1, wherein a frequency of a reference signal to be processed by one of the plurality of first adaptive filters is different from a frequency of a reference signal to be processed by an other one of the plurality of first adaptive filters.

7. The active noise reduction device according to claim 1, wherein the space is a space in a mobile object, the active noise reduction device comprises a controller that obtains information that indicates a moving state of the mobile object, and the controller switches whether to link a frequency of a reference signal to be processed by each of the plurality of first adaptive filters with the moving state of the mobile object, based on the information indicating the moving state of the mobile object obtained.

8. The active noise reduction device according to claim 1, comprising:

a controller that obtains information that indicates a state of the noise, wherein the controller switches whether to set a first setting or a second setting for a frequency of a reference signal to be processed by each of the plurality of first adaptive filters, based on the information indicating the state of the noise obtained, the first setting being for reducing noise in a first frequency range, the second setting being for reducing noise in a second frequency range that is different from the first frequency range.

9. A vehicle comprising:

the active noise reduction device according to claim 1;

the loudspeaker; and the microphone.

10. An active noise reduction device that reduces noise in a space in which a loudspeaker and a microphone are disposed, by outputting cancellation sound from the loudspeaker, the active noise reduction device comprising:

a plurality of first adaptive filters each of which outputs a cancellation signal used to output the cancellation sound by applying a filter coefficient to a reference signal having a specific frequency, the filter coefficient being successively updated based on an error signal outputted from the microphone;

a plurality of feedback filters each of which multiplies the cancellation signal outputted by one of the plurality of first adaptive filters corresponding to the feedback filter by a gain coefficient, and outputs the cancellation signal multiplied by the gain coefficient to the first adaptive filter;

an adder that adds the cancellation signal outputted by each of the plurality of first adaptive filters, and outputs a cancellation signal resulting from the addition; and a band elimination filter that is disposed in each of a first path from each of the plurality of first adaptive filters to the loudspeaker and a second path from the microphone to each of the plurality of first adaptive filters, the band elimination filter comprising: a plurality of first band elimination filters and a second band elimination filter, the plurality of first band elimination filters being disposed in the first path and corresponding to the plurality of first adaptive filters on a one-to-one basis, the second band elimination filter being disposed in the second path and common to the plurality of first adaptive filters.

11. An active noise reduction device that reduces noise in a space in which a loudspeaker and a microphone are disposed, by outputting cancellation sound from the loudspeaker, the active noise reduction device comprising:

a plurality of first adaptive filters each of which outputs a cancellation signal used to output the cancellation sound by applying a filter coefficient to a reference signal having a specific frequency, the filter coefficient being successively updated based on an error signal outputted from the microphone;

a plurality of feedback filters each of which multiplies the cancellation signal outputted by one of the plurality of first adaptive filters corresponding to the feedback filter by a gain coefficient, and outputs the cancellation signal multiplied by the gain coefficient to the first adaptive filter;

an adder that adds the cancellation signal outputted by each of the plurality of first adaptive filters, and outputs a cancellation signal resulting from the addition; and a band elimination filter that is disposed in each of a first path from each of the plurality of first adaptive filters to the loudspeaker and a second path from the microphone to each of the plurality of first adaptive filters, the band elimination filter comprising: a first band elimination filter and a plurality of second band elimination filters, the first band elimination filter being disposed in the first path and common to the plurality of first adaptive filters, the plurality of second band elimination filters being disposed in the second path and corresponding to the plurality of first adaptive filters on a one-to-one basis.

* * * * *